United States Patent
Takeda et al.

(10) Patent No.: US 10,090,988 B2
(45) Date of Patent: Oct. 2, 2018

(54) USER TERMINAL, BASE STATION AND RADIO COMMUNICATION METHOD

(71) Applicant: NTT DOCOMO, INC., Tokyo (JP)

(72) Inventors: Kazuki Takeda, Tokyo (JP); Hiroyuki Ishii, Palo Alto, CA (US)

(73) Assignee: NTT DOCOMO, INC., Tokyo (JP)

(*) Notice: Subject to any disclaimer, the term of this patent is extended or adjusted under 35 U.S.C. 154(b) by 0 days.

(21) Appl. No.: 15/024,976

(22) PCT Filed: Sep. 19, 2014

(86) PCT No.: PCT/JP2014/074861
§ 371 (c)(1),
(2) Date: Mar. 25, 2016

(87) PCT Pub. No.: WO2015/046060
PCT Pub. Date: Apr. 2, 2015

(65) Prior Publication Data
US 2016/0234004 A1    Aug. 11, 2016

(30) Foreign Application Priority Data
Sep. 26, 2013  (JP) .................................. 2013-199481

(51) Int. Cl.
*H04L 5/14* (2006.01)
*H04L 5/00* (2006.01)
(Continued)

(52) U.S. Cl.
CPC .............. *H04L 5/14* (2013.01); *H04L 1/1854* (2013.01); *H04L 5/001* (2013.01); *H04L 5/0055* (2013.01);
(Continued)

(58) Field of Classification Search
None
See application file for complete search history.

(56) References Cited

U.S. PATENT DOCUMENTS

| | | | |
|---|---|---|---|
| 9,538,503 B2 * | 1/2017 | Papasakellariou | .... H04W 72/04 |
| 2013/0039231 A1 | 2/2013 | Wang | |

(Continued)

FOREIGN PATENT DOCUMENTS

| | | |
|---|---|---|
| WO | 2012/108720 A2 | 8/2012 |
| WO | 2012/161510 A2 | 11/2012 |

OTHER PUBLICATIONS

Extended European Search Report issued in corresponding European Application No. 14848183.1, dated Apr. 10, 2017 (11 pages).
(Continued)

*Primary Examiner* — Candal Elpenord
(74) *Attorney, Agent, or Firm* — Osha Liang LLP

(57) ABSTRACT

The present invention is designed so that uplink transmission is carried out adequately even when CA to apply different duplex modes between multiple cells is executed. A user terminal communicates with an FDD cell and a TDD cell by employing carrier aggregation, and has a receiving section that receives DL signals transmitted from each cell, and a feedback control section that allocates delivery acknowledgement signals in response to the DL signals received, by allocating the delivery acknowledgment signals in a predetermined UL subframe, and, regardless of the cell that is configured as the primary cell, when UL subframes are configured in both the FDD cell and the TDD cell, the feedback control section feeds back the delivery acknowledgement signals by using a UL subframe of one or both of the cells, and, when a UL subframe is configured only in the FDD cell, the feedback control section feeds back the delivery acknowledgement signals by using the UL subframe of the FDD cell.

5 Claims, 17 Drawing Sheets

(51) Int. Cl.
 H04W 72/04 (2009.01)
 H04L 1/18 (2006.01)
(52) U.S. Cl.
 CPC ... *H04W 72/0413* (2013.01); *H04W 72/0446* (2013.01); *H04L 5/1469* (2013.01)

(56) References Cited

U.S. PATENT DOCUMENTS

| | | | | |
|---|---|---|---|---|
| 2013/0194931 A1* | 8/2013 | Lee | ............... | H04L 5/0053 370/241 |
| 2013/0322343 A1 | 12/2013 | Seo et al. | | |
| 2013/0343239 A1* | 12/2013 | Damnjanovic | ......... | H04L 5/001 370/280 |
| 2014/0161002 A1* | 6/2014 | Gauvreau | ............. | H04W 16/24 370/280 |
| 2014/0334395 A1 | 11/2014 | Lee et al. | | |
| 2015/0003302 A1* | 1/2015 | Ekpenyong | ........... | H04W 72/14 370/280 |
| 2015/0003304 A1* | 1/2015 | Wu | ............... | H04L 1/1854 370/280 |
| 2015/0023228 A1* | 1/2015 | Yin | ................ | H04L 5/001 370/280 |
| 2016/0182211 A1* | 6/2016 | Choi | ................ | H04W 72/1278 370/280 |

OTHER PUBLICATIONS

International Search Report issued in PCT/JP2014/074861 dated Dec. 9, 2014 (4 pages).
Written Opinion of the International Searching Authority issued in PCT/JP2014/074861 dated Dec. 9, 2014 (5 pages).
3GPP TS 36.300 V11.4.0; 3rd Generation Partnership Project; Technical Specification Group Radio Access Network; Evolved Universal Terrestrial Radio Access (E-UTRA); and Evolved Universal Terrestrial Radio Access Network (E-UTRAN); Overall description; Stage 2 (Release 11); Dec. 2012 (208 pages).
Office Action issued in corresponding European Patent Application No. 14848183.1, dated Jan. 2, 2018 (5 pages).

* cited by examiner

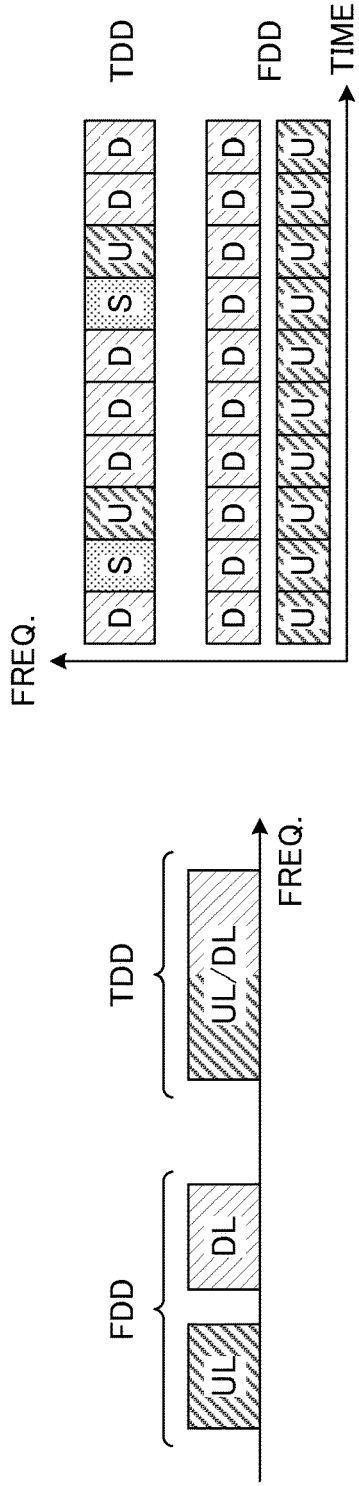
FIG.1A
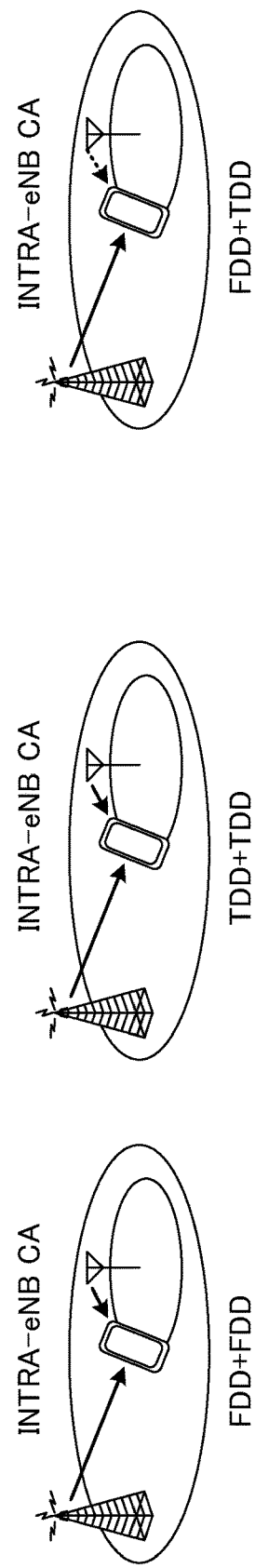
FIG.1B
FIG.1C

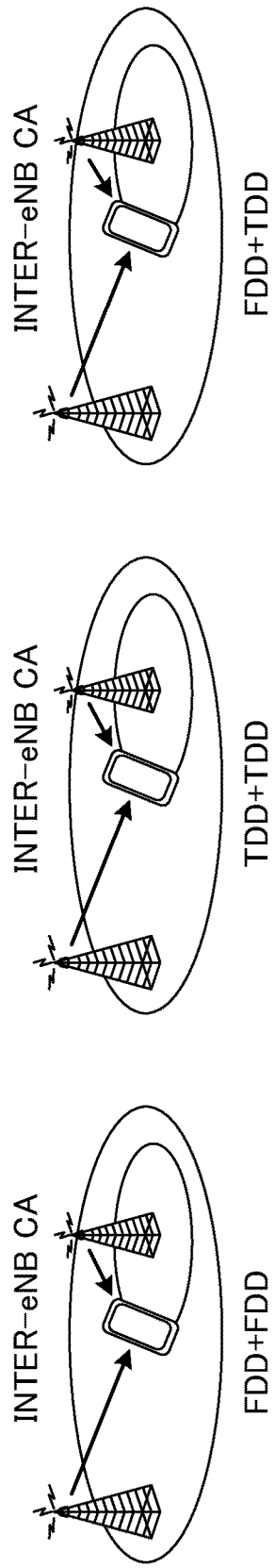
FIG.2A
FIG.2B
FIG.2C

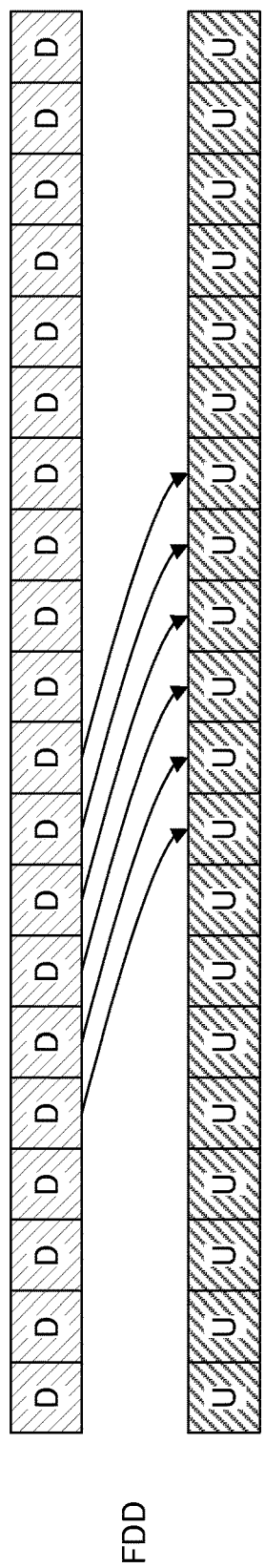
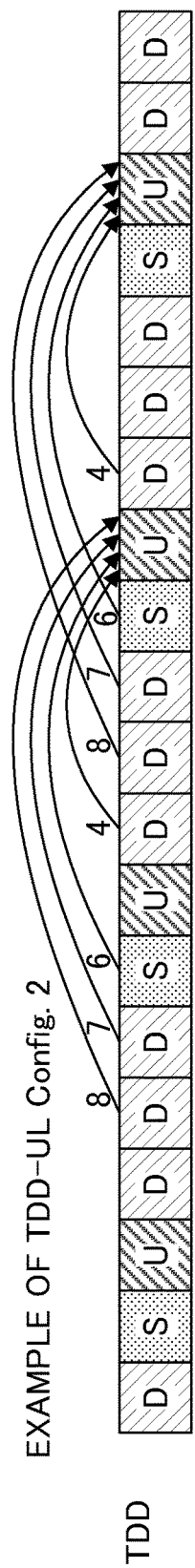
FIG.3A
FIG.3B

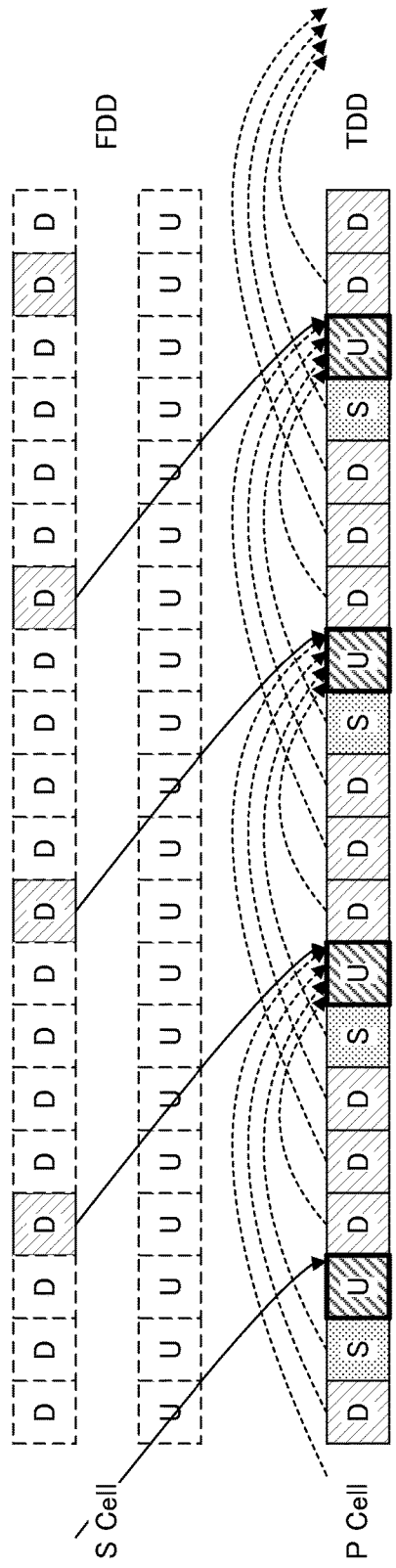
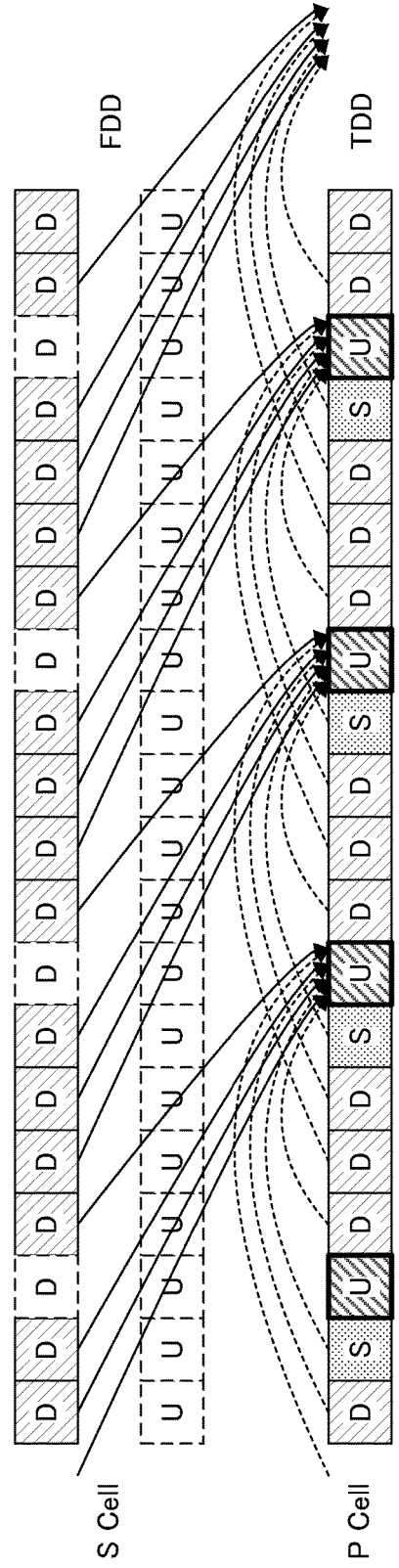
FIG.4A
FIG.4B

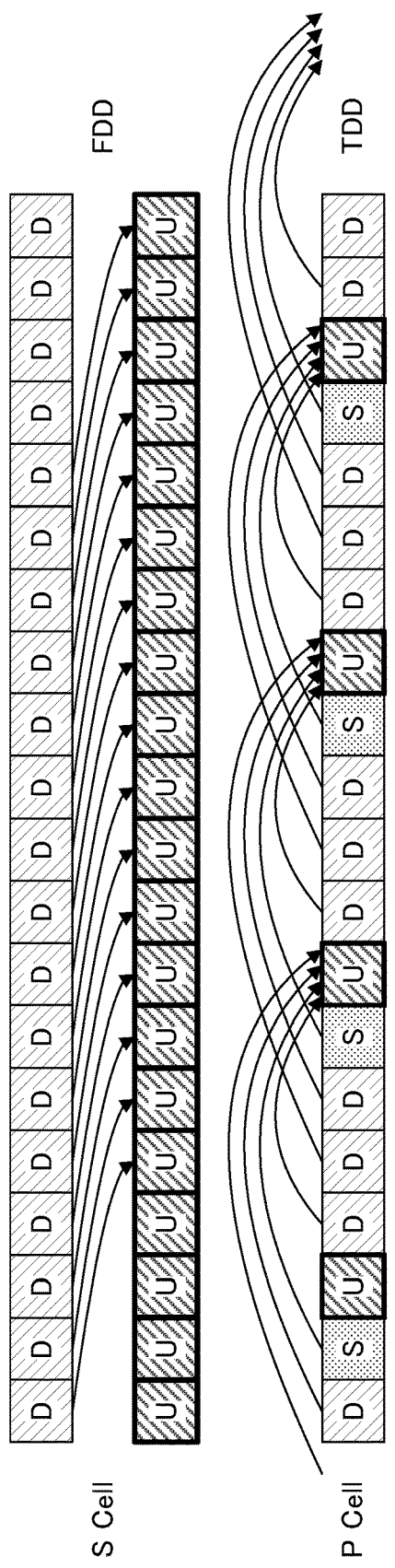
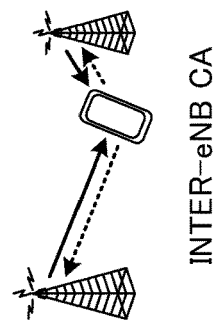
FIG.6A
FIG.6B

USER TERMINAL, BASE STATION AND RADIO COMMUNICATION METHOD

TECHNICAL FIELD

The present invention relates to a user terminal, a base station and a radio communication method that are applicable to a next-generation communication system.

BACKGROUND ART

In a UMTS (Universal Mobile Telecommunications System) network, the specifications of long-term evolution (LTE) have been drafted for the purposes of further increasing high-speed data rates, providing lower delay and so on (non-patent literature 1). In LTE, as multiple-access schemes, a scheme that is based on OFDMA (Orthogonal Frequency Division Multiple Access) is used in downlink channels (downlink), and a scheme that is based on SC-FDMA (Single Carrier Frequency Division Multiple Access) is used in uplink channels (uplink). Also, successor systems of LTE (referred to as, for example, "LTE-advanced" or "LTE enhancement" (hereinafter referred to as "LTE-A")) have been developed for the purpose of achieving further broadbandization and increased speed beyond LTE, and the specifications thereof have been drafted.

As duplex modes for radio communication in LTE and LTE-A systems, there are frequency division duplex (FDD) to divide between the uplink (UL) and the downlink (DL) based on frequency, and time division duplex (TDD) to divide between the uplink and the downlink based on time (see FIG. 1A). In the event of TDD, the same frequency region is applied to uplink and downlink communication, and signals are transmitted and received to and from one transmitting/receiving point by dividing between the uplink and the downlink based on time.

Also, the system band of the LTE-A system (Rel. 10/11) includes at least one component carrier (CC), where the system band of the LTE system constitutes one unit. Gathering a plurality of component carriers (cells) to achieve a wide band is referred to as "carrier aggregation" (CA).

CITATION LIST

Non-Patent Literature

Non-Patent Literature 1: 3GPP TS 36.300 "Evolved UTRA and Evolved UTRAN Overall Description"

SUMMARY OF INVENTION

Technical Problem

In carrier aggregation (CA), which was introduced in Rel. 10/11, the duplex mode to employ between a plurality of CCs (also referred to as "cells," "transmitting/receiving points," etc.) is limited to the same duplex mode (see FIG. 1B). On the other hand, future radio communication systems (for example, Rel. 12 and later versions) may anticipate CA to employ different duplex modes (TDD+FDD) between multiple CCs (see FIG. 1C).

Also, Rel. 10/11 anticipates intra-base station CA (intra-eNB CA), which controls CA by using one scheduler between multiple CCs. In this case, the PUCCH signals (delivery acknowledgement signals (ACKs/NACKs), etc.) that are transmitted in each CC in response to DL data signals (PDSCH signals) are multiplexed to be aggregated in a specific CC (primary cell (PCell)) and transmitted.

When conventional feedback mechanism is used in CA in which different duplex modes (TDD+FDD) are employed between multiple CCs, there is a risk that delivery acknowledgement signals and so on cannot be transmitted adequately on the uplink.

The present invention has been made in view of the above, and it is therefore an object of the present invention to provide a user terminal, a base station and a radio communication method, whereby uplink transmission can be carried out adequately even when CA is executed by applying different duplex modes between multiple cells.

Solution to Problem

The user terminal of the present invention provides a user terminal that communicates with an FDD cell and a TDD cell by employing carrier aggregation, and that has a receiving section that receives DL signals transmitted from each cell, and a feedback control section that allocates delivery acknowledgement signals in response to the DL signals received, by allocating the delivery acknowledgment signals in a predetermined UL subframe, and, in this user terminal, regardless of the cell that is configured as the primary cell, when UL subframes are configured in both the FDD cell and the TDD cell, the feedback control section feeds back the delivery acknowledgement signals by using a UL subframe of one or both of the cells, and, when a UL subframe is configured only in the FDD cell, the feedback control section feeds back the delivery acknowledgement signals by using the UL subframe of the FDD cell.

Advantageous Effects of Invention

According to the present invention, it is possible to carry out uplink transmission adequately even when CA is executed by applying different duplex modes between multiple cells.

BRIEF DESCRIPTION OF DRAWINGS

FIG. 1 provides diagrams to explain an overview of duplex modes in LTE and LTE-A, and intra-base station CA (intra-eNB CA);

FIG. 2 provides diagrams to explain intra-base station CA (intra-eNB CA) and inter-base station CA (inter-eNB CA);

FIG. 3 provides diagrams to explain the DL HARQ timings (uplink A/N feedback timings) in FDD and TDD;

FIG. 4 provides diagrams to explain the feedback timing when existing A/N feedback timing is employed in TDD-FDD CA;

FIG. 6 provides diagrams to show another example of the A/N feedback method according to the present embodiment in TDD-FDD CA;

DESCRIPTION OF EMBODIMENTS

Figure 5:
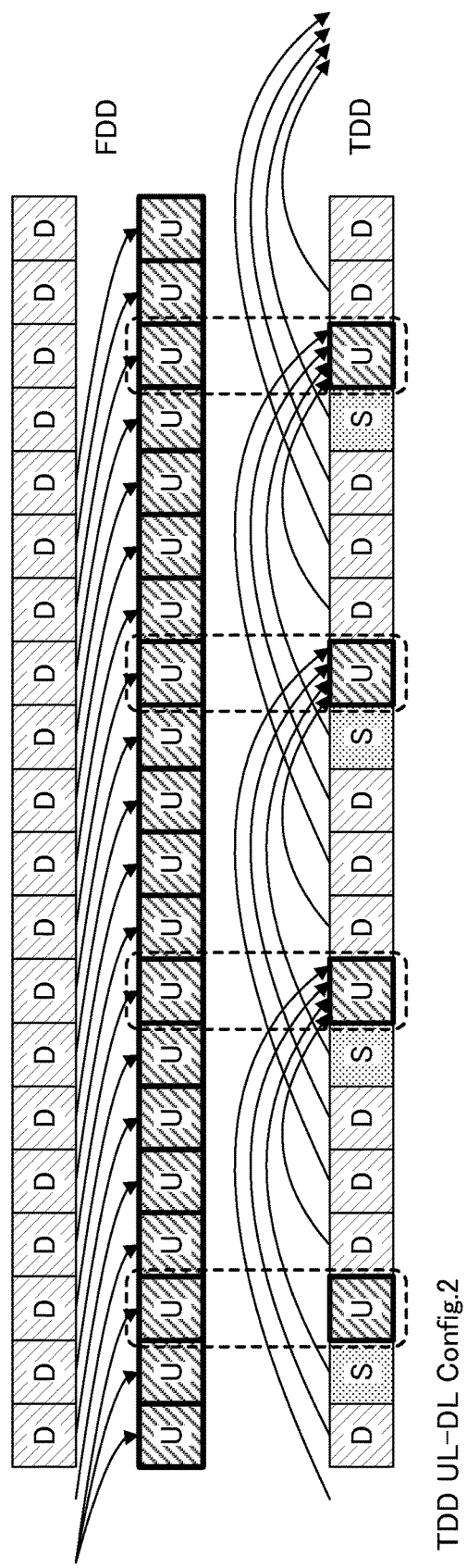
FIG. 5 is a diagram to show an example of the A/N feedback method according to the present embodiment in TDD-FDD CA.

As noted earlier, in LTE and LTE-A systems, two duplex modes—namely, FDD and TDD—are provided (see above FIG. 1A). Also, from Rel. 10 onward, support for intra-base station CA (intra-eNB CA) has been provided. However, CA in Rel. 10/11 is limited to the same duplex mode (FDD+FDD intra-eNB CA or TDD+TDD intra-eNB CA) (see above FIG. 1B).

Meanwhile, the systems of Rel. 12 and later versions presume intra-base station CA (intra-eNB CA), which employs different duplex modes (TDD+FDD) between multiple CCs (see above FIG. 1C). Furthermore, the systems of Rel. 12 and later versions also presume employing inter-base station CA (inter-eNB CA) (see FIG. 2A). Note that inter-base station CA is preferably supported regardless of the duplex mode, and it may be possible to introduce inter-base station CA that accommodates different duplex modes (TDD+FDD).

In intra-base station CA (intra-eNB CA), scheduling is controlled using one scheduler between multiple cells (see FIG. 2B). That is, a user terminal has only to feed back uplink control signals (UCI) such as delivery acknowledgement signals (ACKs/NACKs (hereinafter also referred to as "A/N's")) and/or the like, to a specific cell (PCell) alone.

Meanwhile, in inter-base station CA (inter-eNB CA), schedulers are provided separately for each of multiple cells, and scheduling is controlled on a per cell basis. Also, inter-eNB CA presumes that each base station is connected in such a manner that the delay is not negligible (non-ideal backhaul connection). Consequently, a user terminal has to feed back uplink control signals (UCI) to each cell (see FIG. 2C).

When CA is executed by applying different duplex modes between multiple CCs (cells) (TDD-FDD CA), the problem is how user terminals should send A/N feedback. For example, in inter-eNB CA, multiple CCs may carry out HARQ independently. In this case, it may also be possible to transmit A/N's from a cell that employs FDD (FDD cell) and from a cell that employs TDD, at the same time, in the same subframe.

Meanwhile, in intra-eNB CA, (1) the case where multiple CCs carry out HARQ independently as in inter-eNB CA, and (2) the case where A/N's for multiple CCs are multiplexed in one CC and transmitted may occur. In the latter case of (2), A/N's are gathered in one CC, so that there is no simultaneous transmission of A/N's. Furthermore, in intra-eNB CA, which feedback method a user terminal employs depends on the user terminal's capability (UE capability), the combination of the frequency bands used in each CC (band combination) and so on, and may be configured on the base station side and applied to the user terminal.

In above-described TDD-FDD CA, it may be possible to apply conventional feedback mechanism on an as-is basis. For example, when intra-eNB CA is executed by applying different duplex modes between multiple CCs (above (2)), A/N's for the multiple CCs are multiplexed upon the PCell's PUCCH and fed back. This case will be described below briefly.

FIG. 3A shows the timing a user terminal feeds back ACKs/NACKs in response to the PDSCH signal in a cell to employ FDD (hereinafter also referred to as an "FDD cell"). In this case, the user terminal feeds back the A/N's in UL subframes that come a predetermined number of subframes (for example, 4 ms) after the DL subframes in which the PDSCH signal is allocated.

FIG. 3B shows the timing a user terminal feeds back ACKs/NACKs in response to the PDSCH signal in a cell to employ TDD (hereinafter also referred to as a "TDD cell"). In this case, the user terminal feeds back the A/N's in UL subframes that are assigned in advance to the DL subframes in which the PDSCH signal is allocated.

In TDD up to the Rel. 11 system, the configuration ratio of UL and DL has had a plurality of patterns (DL/UL configurations 0 to 6), and, in each DL/UL configuration, the DL subframes corresponding to UL subframes are determined. For example, FIG. 3B shows the case of DL/UL configuration 2 (DL/UL Config. 2), in which each DL subframe is allocated to (associated with) a predetermined UL subframe. In FIG. 3B, the number that is assigned to each DL subframe (including special subframes) shows the number of subframes from the corresponding UL subframe.

In conventional systems, the timing to feed back A/N's (DL HARQ timing) stays the same even when CA is employed. However, even when CA is applied to UL, A/N transmission using the PUCCH is determined to be carried out only in a specific cell (PCell).

The present inventors have found out that, in CA to apply different duplex modes between multiple CCs (TDD-FDD CA), cases might occur where sending A/N feedback and so on by using the PCell's PUCCH alone results in limiting the UL subframes to use for feedback. For example, when the TDD cell serves as the PCell and the FDD cell serves as the SCell, there is a threat that adequate UL transmission of delivery acknowledgement signals and so on is not possible.

FIG. 4A shows a feedback method in which, when the TDD cell serves as the PCell and the FDD cell serves as the SCell, the DL HARQ timing of the SCell (FDD cell) is coordinated with the above FDD cell's timing (FIG. 3A). In this case, UL subframes for A/N feedback cannot be allocated to many of the DL subframes of the SCell (FDD cell). That is, A/N's in response to the PDSCH signal that is transmitted in each DL subframe cannot be fed back. Furthermore, despite the fact that there are vacant UL subframe resources in the SCell (FDD cell), these cannot be used for the PUCCH.

FIG. 4B shows a feedback method in which, when the TDD cell serves as the PCell and the FDD cell serves as the SCell, the DL HARQ timing of the SCell (FDD cell) is coordinated with the above TDD cell's timing (FIG. 3B). In this case, compared to FIG. 4A, the number of SCell (FDD cell) DL subframes where UL subframes for A/N feedback, which are PCell (TDD cell) subframes, can be allocated increases. However, since the FDD cell's feedback timing (for example, 4 ms) is changed, there is a risk that complex control is required, compared to heretofore. Also, even when there are vacant UL subframe resources in the SCell (FDD cell), these cannot be used for the PUCCH.

So, the present inventors have found out that, when TDD-FDD CA is employed (in particular, when the TDD cell serves as the PCell and the FDD cell serves as the SCell), it is possible to allocate UL subframes to each DL subframe of the PCell and the SCell adequately, by supporting UL transmission (PUCCH transmission) using the PUCCH in the SCell's UL.

To be more specific, in intra-eNB CA, regardless of which of the FDD cell and the TDD cell serves as the PCell, if UL subframes are configured in the FDD cell alone, delivery acknowledgement signals and so on are fed back (PUCCH transmission) by using these UL subframes of the FDD cell. Also, when UL subframes are configured in both the FDD cell and the TDD cell (when the TDD cell's UL subframes are configured), the present inventors have come up with the idea of feeding back delivery acknowledgement signals by using the UL subframes of one or both of the TDD cell and the FDD cell (see FIG. 5).

That is, in intra-eNB CA, in subframes other than the subframes where UL is configured in both the FDD cell and the TDD cell, A/N-related PUCCH transmission is carried out by using the FDD cell's UL subframes. To be more specific, among the DL subframes of the FDD cell, A/N's in response to DL subframes apart from the DL subframes that are four subframes before UL subframes in the TDD cell are fed back using the FDD cell's UL subframes. By this means, regardless of which of the FDD cell and the TDD cell serves as the PCell, FDD UL subframe resource are utilized effectively. Also, in subframes in which the FDD cell and the TDD cell are both directed to UL, the A/N feedback method (feedback target and so on) is controlled.

A structure may be employed in which, in subframes where the FDD cell and the TDD cell are both directed to UL, the base stations configure the selection of the cell to carry out PUCCH transmission (the FDD cell and/or the TDD cell) and report this to user terminals.

For example, intra-eNB CA, in subframes (TDD UL subframes) in which the FDD cell and the TDD cell are both directed to UL, each cell's A/N's are fed back using each cell's PUCCH. In this case, it is possible to apply the same feedback timing as in inter-eNB CA, so that a user terminal can support both intra-eNB CA and inter-eNB CA with one function (see FIGS. 6A and 6B). By this means, it is possible to supply terminals at low cost, without making the radio (RF) circuit and the baseband circuit complex.

Alternatively, in intra-eNB CA, in subframes in which the FDD cell and the TDD cell are both directed to UL, the A/N's of each CC are gathered and multiplexed in the PUCCH of one CC and fed back. Since feeding back the A/N's of each CC by using one CC makes it possible to avoid using multi-carrier transmission, so that it is possible to prevent out-of-band radiation, the increase of peak transmission power and so on, and carry out transmission with greater power. Also, it becomes possible to secure coverage.

Now, when the A/N's of each CC are gathered and multiplexed in the PUCCH of one CC, which one of the TDD cell and the FDD cell should be selected is the problem. The method of selecting the cell (CC) when the A/N's of each CC are gathered and multiplexed in the PUCCH of one CC will be described below in detail with reference to the accompanying drawings. Note that, although cases will be described as examples in which DL/UL configuration 2 is used in the TDD cell in the following description, the DL/UL configuration that is applicable to the present embodiment is by no means limited to this.

First Embodiment

A method will be described, with a first embodiment, whereby, in subframes in which the FDD cell and the TDD cell are both directed to UL (when TDD UL subframes are configured), A/N's for multiple CCs are multiplexed upon the PUCCH of one CC and fed back.

Example 1

Figure 7:
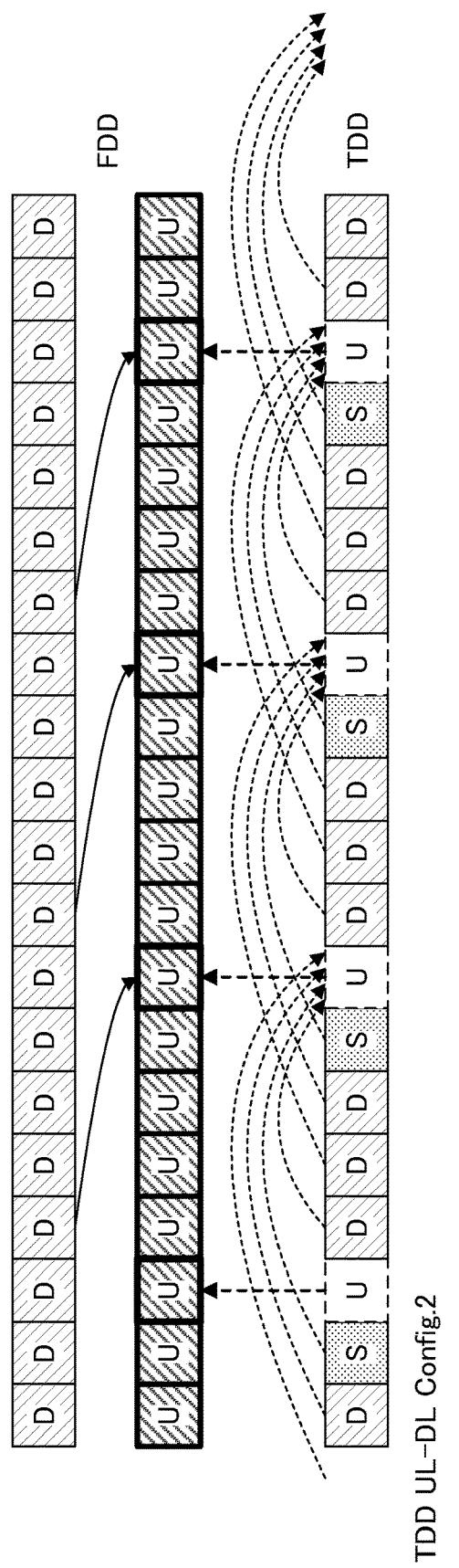
FIG. 7 is a diagram to show another example of the A/N feedback method according to the present embodiment in TDD-FDD CA.

With example 1, when A/N's are transmitted in one CC, PUCCH transmission is carried out only in the FDD cell (see FIG. 7). That is, even when the FDD cell serves as the SCell, ACK/NACK feedback is sent using the PUCCH of the FDD cell, as in the case of the PCell. Note that, although FIG. 7 only shows, in the FD cell, allocating DL subframes to subframes in which the FDD cell and the TDD cell are both directed to UL, the other DL subframes are also allocated to UL subframes, as has been shown in above FIG. 5. The same holds with following FIGS. 8, 9, 11 and 12.

In this case, even in subframes in which the FDD cell and the TDD cell are both directed to UL, A/N's of the FDD cell and the TDD cell are multiplexed over the PUCCH of the FDD cell. In the other subframes, A/N's for the FDD cell are multiplexed over the PUCCH of the FDD cell and transmitted.

By controlling the feedback method as shown in FIG. 7, unlike TDD in which UL subframes are limited, it is possible to gather PUCCHs in the FDD cell where UL is configured every subframe, so that it is possible not to make vacant UL resources, and make effective use of UL resources. Also, when the FDD cell use a lower frequency than the TDD cell, it is possible to secure UL coverage effectively, by gathering and multiplexing PUCCHs in the FDD cell's UL.

Example 2

Figure 8:
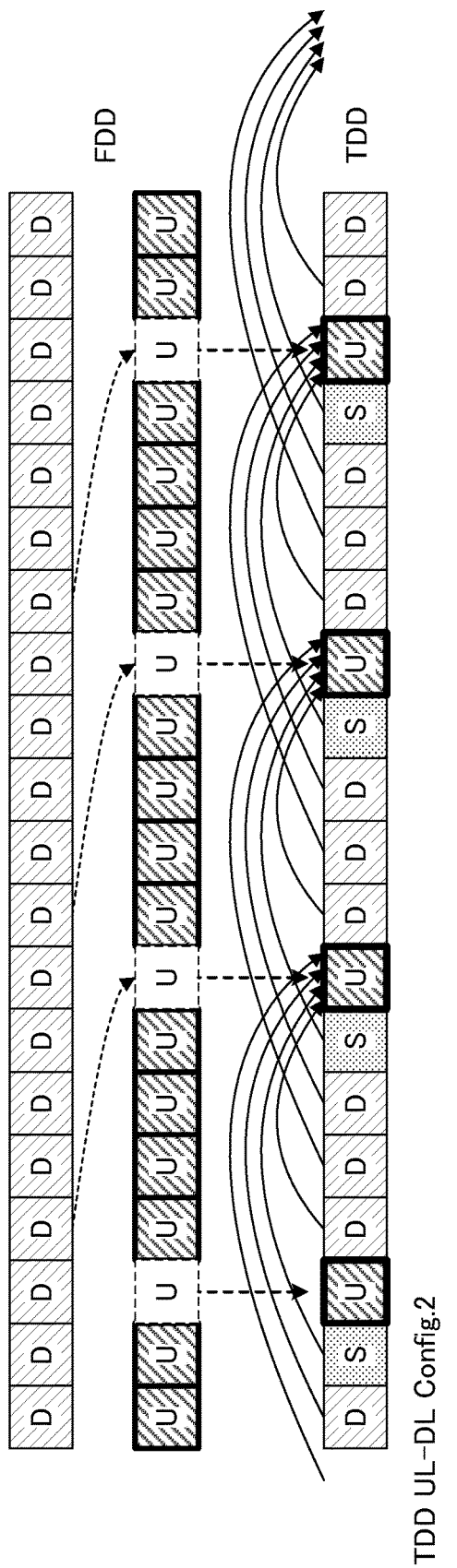
FIG. 8 is a diagram to show another example of the A/N feedback method according to the present embodiment in TDD-FDD CA.

With example 2, when A/N's are transmitted in one CC, PUCCHs are transmitted using the FDD cell and the TDD cell (see FIG. 8). To be more specific, in subframes in which the FDD cell and the TDD cell are both directed to UL, PUCCH transmission is carried out in the TDD cell's UL. Also, in the other subframes, PUCCH transmission is carried out in the FDD cell's UL. In this case, the TDD cell and the FDD cell carry out PUCCH transmission separately, in different subframes, and the FDD cell and the TDD cell do not carry out PUCCH transmission at the same time.

As shown in FIG. 8, by transmitting delivery acknowledgement signals by using the UL PUCCHs of the FDD cell and the TDD cell, it is possible to disperse the PUCCH transmission for each cell.

Note that it is preferable to apply above example 1, particularly when FDD cell serves as the PCell (when the SCell serves as the TDD cell). On the other hand, example 2 is suitable for application particularly when the TDD cell serves as the PCell (when the FDD cell serves as the SCell). That is, PUCCH transmission by the SCell is applied only when the TDD cell serves as the PCell.

By this means, it is possible to prevent unnecessary PUCCH transmission in the SCell when FDD cell serves as the PCell, and disperse PUCCH transmission to the FDD cell (PUCCH off-loading) when the TDD cell serves as the PCell. Furthermore, regardless of which of the TDD cell and the FDD cell is the PCell, PUCCH transmission for the PCell's DL assignments is all carried out in the PCell, thereby allowing easy fallback.

Also, when, in TDD-FDD CA, the area size, the number of users accommodated, the traffic and so on are not even between the FDD cell and the TDD cell, for example, a case might occur where, while many small cells are superposed over one macro cell and the macro cell supports the coverages, the small cells that are provided within the macro cell each offer high-capacity communication in a comparatively small area, to a small number of users. In an environment like this, above example 1 is preferable to apply particularly when the TDD cell serves as the PCell (when the FDD cell serves as the SCell). On the other hand, example 2 may be applied when either the FDD cell or the TDD cell serves as the PCell. That is, it is preferable to apply example 2 as much as possible when PUCCH transmission is carried out in the SCell.

In an environment such as described above, the general assumption is to make the macro cell the PCell and the small cells SCells, and offer additional high-capacity communication in the SCells. In this case, since the macro cell (PCell) communicates with a large number of users, the UL resources are likely to be busy. Consequently, by carrying out PUCCH transmission as much as possible in the small cells (SCells) where there are fewer users, it is possible to disperse the PUCCHs over a large number of small cells, and prevent the macro cell's UL resources from being busy.

Example 3

With example 3, when A/N's are transmitted in one CC, in subframes in which the FDD cell and the TDD cell are both directed to UL, PUCCH transmission is carried out by selecting the UL of one of the FDD cell and the TDD cell based on a predetermined condition. The predetermined condition may be whether or not there is an A/N to transmit in each cell in timings where the FDD cell and the TDD cell both use UL subframes.

Figure 9:
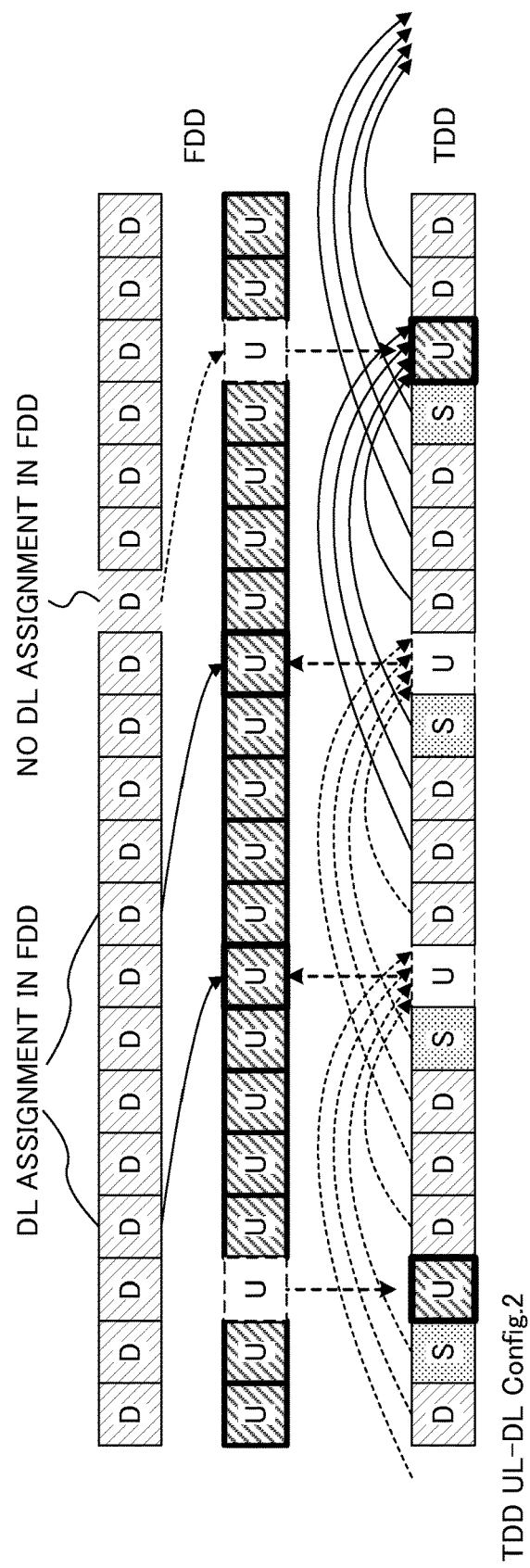
FIG. 9 is a diagram to show another example of the A/N feedback method according to the present embodiment in TDD-FDD CA.

For example, in a subframe in which the FDD cell and the TDD cell are both directed to UL, if there is an A/N to transmit in response to a DL signal (PDSCH signal) of the FDD cell, the PUCCH is allocated to the FDD cell's UL and transmitted, and, if there is no A/N to transmit, the PUCCH is allocated to the TDD cell's UL and transmitted (see FIG. 9). By this means, the scheduler can control the cell to carry out PUCCH transmission, so that dynamic PUCCH off-loading becomes possible. Also, since PUCCH transmission can be gathered in the cell with the heavier DL scheduling, it is possible to make the DL/UL traffic even.

For example, in the event the macro cell and the small cells carry out TDD-FDD-based intra-eNB CA, there is a high possibility that the DL traffic shows good channel quality and concentrates in the small cells where the traffic of other users is comparatively light. In this case, it is possible to concentrate the PUCCHs in the small cells in accordance with the DL traffic that is concentrated in the small cells. Consequently, in an environment where a macro cell and many small cells overlap, it is possible to achieve a high off-loading effect in both DL/UL. Furthermore, when there are A/N's to transmit in response to DL assignments of both the FDD cell and the TDD cell, the A/N's are transmitted by allocating the PUCCHs to the FDD cell's UL, so that it is possible to use vacant FDD UL when the traffic is heavy in TDD UL.

Alternatively, if there is an A/N to transmit in response to a DL signal of the TDD cell in a subframe in which the FDD cell and the TDD cell are both directed to UL, the PUCCH may be allocated to the TDD cell's UL and transmitted, and, if there is no A/N to transmit, the PUCCH may be allocated to the FDD cell's UL and transmitted. In this case, if there are A/N's to transmit in response to DL assignments of both the FDD cell and the TDD cell, the PUCCHs are allocated to the TDD cell's UL and transmitted. By this means, the scheduler can control the cell to carry out PUCCH transmission, so that dynamic PUCCH off-loading becomes possible.

For example, in the case where the macro cell and the small cells carry out TDD-FDD-based intra-eNB CA, there is a high possibility that the DL traffic shows good channel quality and concentrates in the small cells where the traffic of other users is comparatively light. In this case, it is possible to concentrate the PUCCHs in the small cells in accordance with the DL traffic that is concentrated in the small cells. Consequently, in an environment where a macro cell and many small cells overlap, it is possible to achieve a high off-loading effect in both DL/UL. Furthermore, when there are A/N's to transmit in response to DL assignments of both the FDD cell and the TDD cell, the A/N's are transmitted by allocating the PUCCHs to the FDD cell's UL, so that, in an environment in which TDD cells are small cells, it is possible to off-load the PUCCHs in the small cells where there are small number of users and where the traffic is comparatively light.

Note that base stations can report in which cell's UL PUCCH transmission is carried out in timings where the FDD cell and the TDD cell are both directed to UL, to user terminals, by using downlink control information (DCI), higher layer signaling (for example, RRC signaling) and so on. For example, base stations can report information about the cells to user terminals by using bits that are not used in existing DCI, bits that relate to PUCCH resources and so on. Now, the method of reporting from base stations to user terminals will be described below.

The base stations can specify the cell to perform PUCCH transmission, by using the TPC command field (also referred to as "ARI") that is contained in the SCell's DCI. The ARI is an ACK/NACK resource indicator (A/N resource indicator) that was introduced in Rel. 10, and that is used to specify the PCell's PUCCH resource that is used to send A/N feedback for the PDSCH transmitted from the SCell when CA is employed. To be more specific, a plurality of PUCCH resource candidates are reported in advance to a user terminal through higher layers such as RRC, and one among these is specified by the ARI.

The ARI introduced in Rel. 10 can only specify the PUCCH resources in the PCell. So, the present embodiment is structured so that a plurality of PUCCH resource candidates can be configured, over the PCell and the SCell, by using ARIs. A user terminal selects the CC to carry out PUCCH transmission and the PUCCH resource, by using the ARIs reported from the base stations.

In this way, by selecting the feedback target cell (the cell where A/N's are gathered) by using the ARI, in timings where the FDD cell and the TDD cell are both directed to UL, it is possible to control PUCCH transmission dynamically and flexibly. By this means, it is possible to disperse PUCCH transmission to each cell (for example, the TDD cell), and achieve an off-loading effect. Furthermore, by carrying out the transmission power control (TPC) for the PUCCH signal based on TPC commands contained in the PCell's DCI, and selecting the CC and resource to carry out PUCCH transmission by using the SCell's TPC commands, it is possible to prevent the increase of overhead.

Furthermore, the base stations can specify the cell to carry out PUCCH transmission by using the bit field (also referred to as "ARO") that is contained in the DCI transmitted in the enhanced PDCCH (EPDCCH), and that applies an offset to the PUCCH resource index (ECCE index). The ARO was introduced in Rel. 11, and specifies the offset value to add to the enhanced control channel element index (ECCE index) when determining the PUCCH resource to use in the A/N feedback for the PDSCH that is modulated using the EPDCCH. The enhanced PDCCH (EPDCCH) is a downlink control channel that is allocated to be frequency-division-multiplexed with the PDSCH (downlink shared data channel).

The ARO that was introduced in Rel. 11 does not take into account the application of CA (non-CA), and therefore is not used (zero-fixed) when CA is employed. So, with the present embodiment, the cell (the PCell or the SCell) to carry out PUCCH transmission is specified by using the ARO. A user terminal selects the CC to carry out PUCCH transmission based on the ARO reported.

In this way, it is possible to control PUCCH transmission dynamically and flexibly by selecting the feedback target cell (the cell where A/N's are gathered) by using the ARO, in timings where the FDD cell and the TDD cell are both directed to UL. By this means, it is possible to disperse PUCCH transmission to each cell, and achieve an off-loading effect.

Also, when transmitting DCI in the EPDCCH, the base stations can apply the above-described ARI of the SCell and the ARO in combination, and report the feedback target cell and the PUCCH resource to the user terminal. For example, the base stations specify the CC to carry out PUCCH transmission with the ARO, specify the PUCCH resource in this CC with the ARI, and report these to the user terminal. In this case, each specified CC may be configured with a different PUCCH resource candidate set. In this way, by using the ARI and the ARO, it becomes possible to make effective use of unused bits, and, furthermore, execute PUCCH transmission control and off-loading in a flexible manner.

Also, the base stations may indicate information related to the cell to carry out PUCCH transmission in timings where the FDD cell and the TDD cell are both directed to UL, by using the resource and configuration (Config) of the control channel (PDCCH/EPDCCH) that transmits downlink control information (DCI).

For example, the base stations can associate each cell with a type of a search space (common-SS or UE-specific-SS) and indicate these to the user terminal. In one example, PUCCH transmission is carried out in the PCell in the event of the common search space (C-SS) and carried out in the SCell in the event of a user-specific search space (UE-SS).

Alternatively, the base stations can associate each cell with a type of a control channel (PDCCH or EPDCCH) and indicate these to the user terminal. In one example, PUCCH transmission is carried out in the PCell in the event of the PDCCH and carried out in the SCell in the event of the EPDCCH.

Alternatively, the base stations can associate each cell with a location in the PDCCH/EPDCCH where downlink control information (DCI) is scheduled (CCE index), and indicate these to the user terminal. In one example, PUCCH signal transmission is carried out in the PCell when DCI is mapped to CCE/ECCE indices 0 to 30 in the PDCCH/EPDCCH, and carried out in the SCell otherwise.

In this way, by associating cell information with search space types, control channel types, PDCCH/EPDCCH locations and so on, it is possible to specify the CC to carry out PUCCH transmission based on the scheduling of DCI. By this means, it is possible to prevent the increase of overhead. Furthermore, it may be possible to carry out PUCCH transmission in the SCell, for example, only when the UE-SS and the EPDCCH are used, and carry out PUCCH transmission in the PCell otherwise, including when, for example, the C-SS and the PDCCH are used. By this means, even when the re-configuration of UE-specific RRC parameters is in progress, it is possible to continue communication (fallback), without disconnection, by using the C-SS and the PDCCH.

According to the present embodiment, when the PUSCH signal is transmitted in A/N transmission timings (subframes), the user terminal can transmit the PUCCH and the PUSCH simultaneously, or multiplex and transmit A/N's in the PUSCH.

When transmitting the PUCCH and the PUSCH simultaneously, the user terminal, regardless of the allocation of the PUSCH, transmits an A/N (PUCCH transmission) by using the PUCCH of the CC where the A/N is planned to be transmitted. That is, the user terminal transmits an UL data signal and an A/N simultaneously by using the PUSCH and the PUCCH.

On the other hand, when not transmitting the PUSCH and the PUCCH simultaneously, the user terminal multiplexes and transmits an A/N in the PUSCH even in the CC where the A/N is planned to be transmitted. Note that, when PUSCH transmission is carried out in multiple CCs (PCell and SCell), A/N's are multiplexed over the PCell's PUSCH. Furthermore, when the PCell does not carry out PUSCH transmission and a plurality of SCells carry out PUSCH transmission, it is possible to multiplex and transmit A/N's in a cell with a small SCell index.

Second Embodiment

With the first embodiment described above, user terminals that can employ uplink CA (UL CA capable UEs) can implement FDD-TDD CA. Meanwhile, there is a risk that user terminals that do not support UL CA cannot implement FDD-TDD CA. For example, low-cost user terminals and/or the like may support DL CA but may not support UL CA. Also, depending on the combination of the frequency bands used in each CC, there may be a possibility that user terminals are unable to execute UL CA.

User terminals that do not support UL CA (UL CA non-capable UEs) have only one RF for UL. Consequently, for example, as shown in FIG. 8 above, switching the UL frequency on a per subframe becomes difficult. Meanwhile, in order to allow as many user terminals as possible to implement TDD-FDD CA in as many environments as possible, it is preferable to employ a system in which even user terminals that do not support UL CA can employ the above-described TDD-FDD CA.

Figure 10:
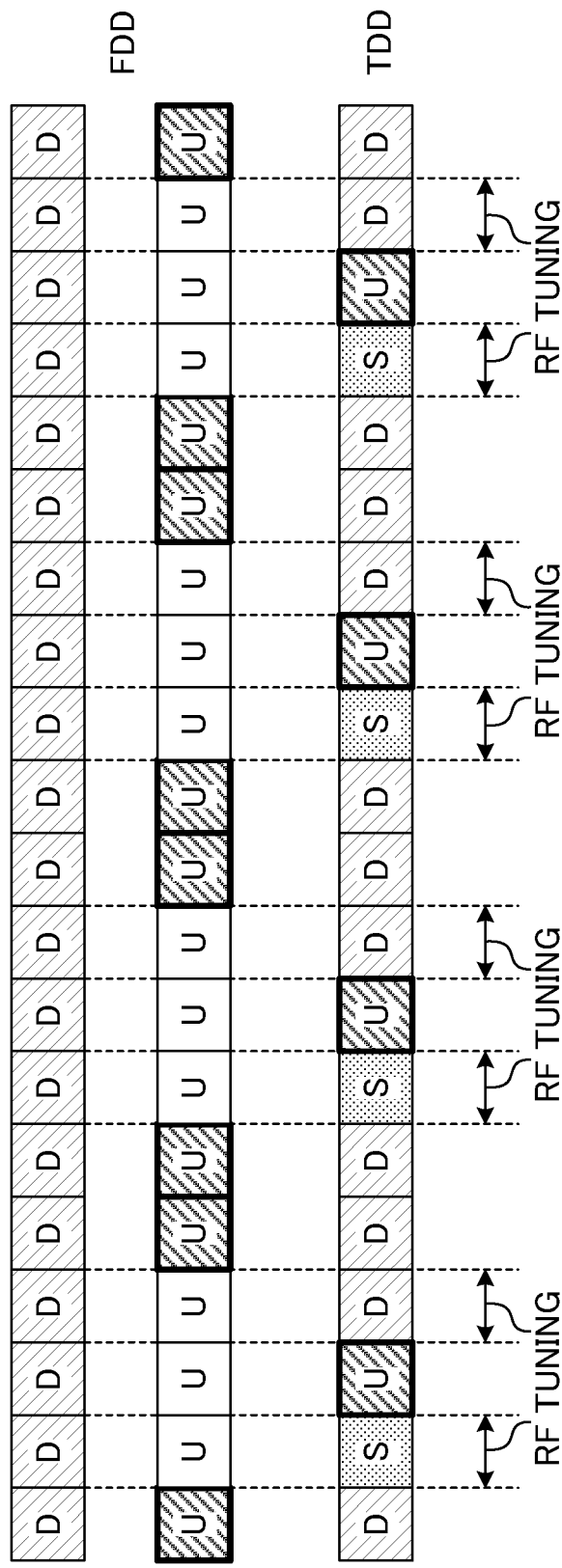
FIG. 10 is a diagram to explain an example of a feedback method to provide RF tuning periods in TDD-FDD CA.

In order to solve this problem, when user terminals that do not support UL CA carry out TDD-FDD CA, or carry out PUCCH transmission in the UL of both the TDD cell and the FDD cell, it may be possible to provide periods (RF tuning periods) in which UL transmission is not carried out, before and after the TDD cell's UL subframes (see FIG. 10). For example, 1 ms or so before and after TDD UL subframes are made RF tuning periods.

However, with the method illustrated in FIG. 10, UL transmission is not possible during RF tuning, and there is a risk that the throughput of UL transmission decreases. Furthermore, since A/N feedback cannot be sent either in periods where UL transmission cannot be performed, the allocation of DL signals (PDSCH signals) is also limited. Due to this, there is also a risk that the throughput of DL transmission decreases too.

So, with a second embodiment, in timings where the FDD cell and the TDD cell are both directed to UL (the TDD cell's UL subframes), the cell to carry out PUCCH transmission is controlled depending on whether or not there are A/N's to transmit in the FDD cell or the TDD cell. That is, PUCCH transmission in the TDD cell is selected and RF tuning periods are provided taking into account the transmission of A/N's. By this means, even when a user terminal that does not support UL CA switches PUCCH transmission between the ULs of the FDD cell and the TDD cell, it is possible to reduce the decrease of throughput.

For example, in timings where the FDD cell and the TDD cell are both directed to UL, the user terminal carries out PUCCH transmission in the TDD cell's UL, only when there is no A/N transmission from the FDD cell. Otherwise, the user terminal carries out PUCCH transmission in the FDD cell's UL (see FIG. 11). That is, when there is A/N transmission in both the FDD cell and the TDD cell, PUCCH transmission is gathered in the FDD UL and carried out. By this means, even when PUCCH transmission is carried out in the TDD cell, it is possible to reduce the impact of RF tuning periods. Meanwhile, when PUCCH transmission is carried out many times in the TDD cell alone, although RF tuning occurs frequently, it is nevertheless possible to concentrate the PUCCHs in the TDD cell. Consequently, in accordance with the concentration of DL traffic, it is also possible to concentrate UL traffic likewise.

Alternatively, if there is A/N transmission in the TDD cell in timings where the FDD cell and the TDD cell are both directed to UL, PUCCH transmission is carried out using the TDD cell's UL. In this case, when there is A/N transmission in both the FDD cell and the TDD cell, PUCCH transmission is gathered in the TDD UL and carried out.

In this way, depending on whether or not there are A/N's to transmit in the FDD cell or in the TDD cell, it is possible to make the traffic (PUCCH transmission) comparatively concentrated in TDD. Consequently, when, for example, the FDD cell is a macro cell and the TDD cell is a small cell, it is possible to distribute more PUCCHs to the TDD small cell where the UL resources are more likely to be vacant. Also, by carrying out PDCCH transmission not only by using the FDD cell, but also by using the TDD cell as well, it is possible to disperse the traffic and achieve an off-loading effect.

Whether or not RF tuning is applied in timings where the FDD cell and the TDD cell are both directed to UL can be indicated from the base stations to the user terminal by using downlink control information (DCI), higher layer signaling and so on. In this case, preferably, the base stations send the indication by using bits that are not used in existing DCI or bits that relate to PUCCH resources. Now, the method of reporting from the base stations to the user terminal will be described below. Note that description will be omitted in parts that are the same as in the above-described radio base station-UE reporting method.

For example, the base stations can indicate whether or not RF tuning is applied by using the TPC command field (ARI) that is contained in the SCell's DCI. Also, the base stations can specify whether or not RF tuning is applied by using the bit field (ARO) that is contained in the DCI transmitted in the EPDCCH and that adds an offset to the PUCCH resource index.

In one example, a user terminal carries out RF tuning when PUCCH transmission in the TDD cell's UL is commanded by an ARI or an ARO. By this means, it is possible to control PUCCH transmission dynamically and flexibly, and, by dispersing PUCCH transmission to each cell, achieve an off-loading effect. Furthermore, since the user terminal does not carry out RF tuning when there is no command by way of an ARI or an ARO, it is possible to prevent producing unnecessary non-transmission periods in UL.

Also, when transmitting DCI in the EPDCCH, the base stations can apply the above-described ARI of the SCell and the ARO in combination, and report whether or not RF tuning is applied and the PUCCH resource to the user terminal. For example, the base stations specify whether or not RF tuning is applied with the ARO, specify the PUCCH resource in this CC with the ARI, and report these to the user terminal. In this way, by using the ARI of the SCell and the ARO, it becomes possible to make effective use of unused bits, and, furthermore, control PUCCH transmission flexibly and execute off-loading. Furthermore, since the user terminal does not carry out RF tuning when there is no command by way of an ARI or an ARO, it is possible to prevent producing unnecessary non-transmission periods in UL.

Also, the base stations can indicate to the user terminal whether or not RF tuning is applied by using the resource and configuration (Config) of the control channel (PDCCH/EPDCCH) that transmits downlink control information (DCI).

For example, the base stations can associate each cell with a type of a search space (common-SS or UE-specific-SS) and indicate these to the user terminal. In one example, PUCCH transmission is carried out in the PCell in the event of the common search space (C-SS) and carried out in the SCell in the event of a user-specific search space (UE-SS). By this means, RF tuning is not applied unless the search space type changes, so that it is possible to prevent producing unnecessary non-transmission periods in UL. Furthermore, by switching the search space type, it is possible to control RF tuning, and, by switching the CC to carry out PUCCH transmission, achieve off-loading.

Alternatively, the base stations can associate each cell with a type of a control channel (PDCCH or EPDCCH) and indicate these to the user terminal. In one example, PUCCH transmission is carried out in the PCell in the event of the PDCCH and carried out in the SCell in the event of the EPDCCH. By this means, RF tuning is not applied unless the control channel type changes, so that it is possible to prevent producing unnecessary non-transmission periods in UL. Furthermore, by switching the control channel type, it is possible to control RF tuning, and, by switching the CC to carry out PUCCH transmission, achieve off-loading.

Alternatively, the base stations can associate each cell with a location in the PDCCH/EPDCCH where downlink control information (DCI) is scheduled (CCE index), and indicate these to the user terminal. In one example, PUCCH signal transmission is carried out in the PCell when DCI is mapped to CCE/ECCE indices 0 to 30 in the PDCCH/EPDCCH, and carried out in the SCell otherwise. By this means, it is possible to prevent producing unnecessary UL non-transmission periods by controlling RF tuning with a scheduler, and, furthermore, control PUCCH off-loading by carrying out RF tuning (switching the PUCCH transmission cell).

In this way, by associating cell information with search space types, control channel types, PDCCH/EPDCCH locations and so on, it is possible to specify the CC to carry out PUCCH transmission based on the scheduling of DCI, without increasing the overhead.

(Variation)

Note that, although cases have been shown in the above description where the feedback timing for when CA is not employed is used as the HARQ timing in response to the allocation of DL signals (PDSCH signals) of each of the FDD cell and the TDD cell, the present embodiment is by no means limited to this. For example, it is equally possible to make the DL HARQ timing in the TDD cell the same as the DL HARQ timing in FDD, in intra-eNB CA (see FIG. 12). In this case, the A/N in response to the PDSCH signal that is transmitted in each DL subframe of the TDD cell can be fed back in the UL subframe of the FDD cell that comes a predetermined period (for example, 4 ms) after the subframe in which the PDSCH signal is transmitted. By this means, it is possible to reduce the feedback delay in TDD DL HARQ to 4 ms. Also, since it is possible to reduce the number of delivery acknowledgement signals to feed back in one UL subframe and disperse these signals over a plurality of subframes, even when a base station fails to detect a delivery acknowledgement signal, it is possible to reduce the impact this has on DL HARQ.

Figure 12:
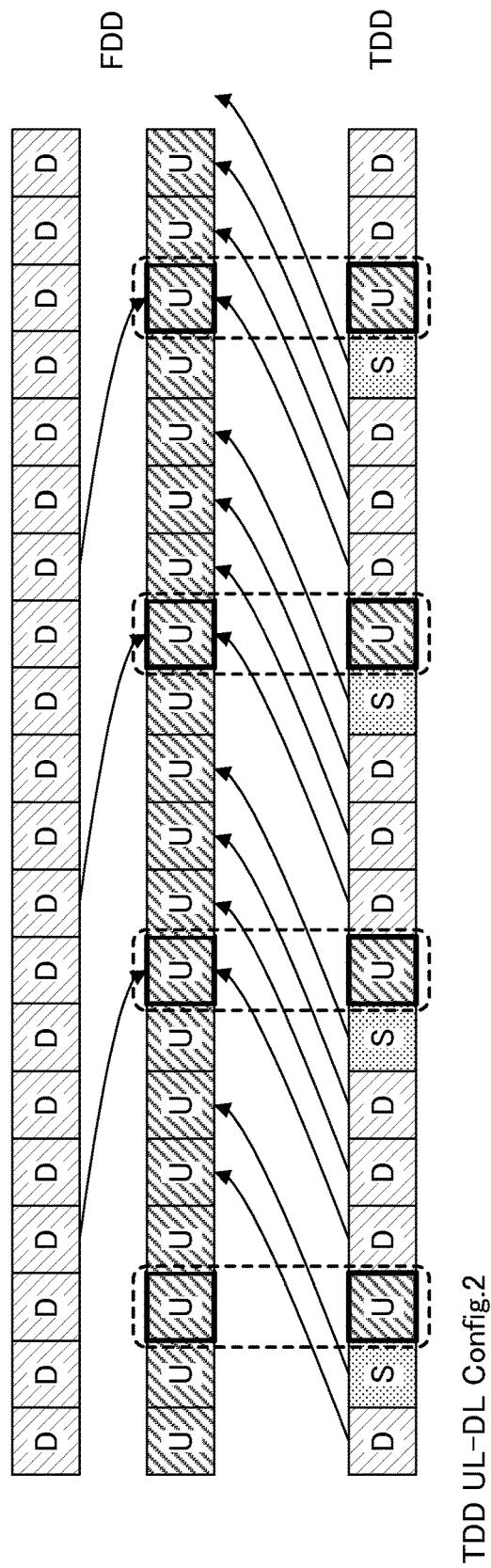
FIG. 12 is a diagram to explain another example of DL HARQ timing that is applicable to the present embodiment in TDD-FDD CA.

Meanwhile, in the case illustrated in FIG. 12, in timings (TDD cell's UL subframes) where the FDD cell and the TDD cell are both directed to UL, in which CC the A/N's should be multiplexed and PUCCH transmission should be carried out is the problem. In this case, it is possible to select the cell to carry out PUCCH transmission by using one of the examples shown with the above first embodiment. For example, referring to FIG. 12, cases might occur in a subframe in which the FDD cell and the TDD cell are both directed to UL, including the case where PUCCH transmission is carried out only in one cell (the FDD cell or the TDD cell) regardless of the configuration of the primary cell, or the case where PUCCH transmission is carried out in the cell that carries out A/N transmission in this subframe.

Also, although TDD-FDD CA has been described in the above description, the configuration that is applicable to the present embodiment is by no means limited to this. The present embodiment is equally applicable to FDD-FDD CA, TDD-TDD CA and so on.

For example, in FDD-FDD or TDD-TDD inter-base station CA (inter-eNB CA), multiple CCs carry out HARQ independently. In this case, it is also possible to transmit A/N's (PUCCH transmission) from multiple cells at the same time, in the same subframe. Meanwhile, in FDD-FDD or TDD-TDD intra-base station CA (intra-eNB CA), (1) the case where multiple CCs carry out HARQ independently as in inter-eNB CA, and (2) the case where A/N's for multiple CCs are multiplexed in one CC and transmitted may occur. In the latter case of (2), A/N's are gathered in one CC, so that there is no simultaneous transmission of A/N's.

(Structure of Radio Communication System)

Now, an example of a radio communication system according to the present embodiment will be described in detail below.

Figure 13:
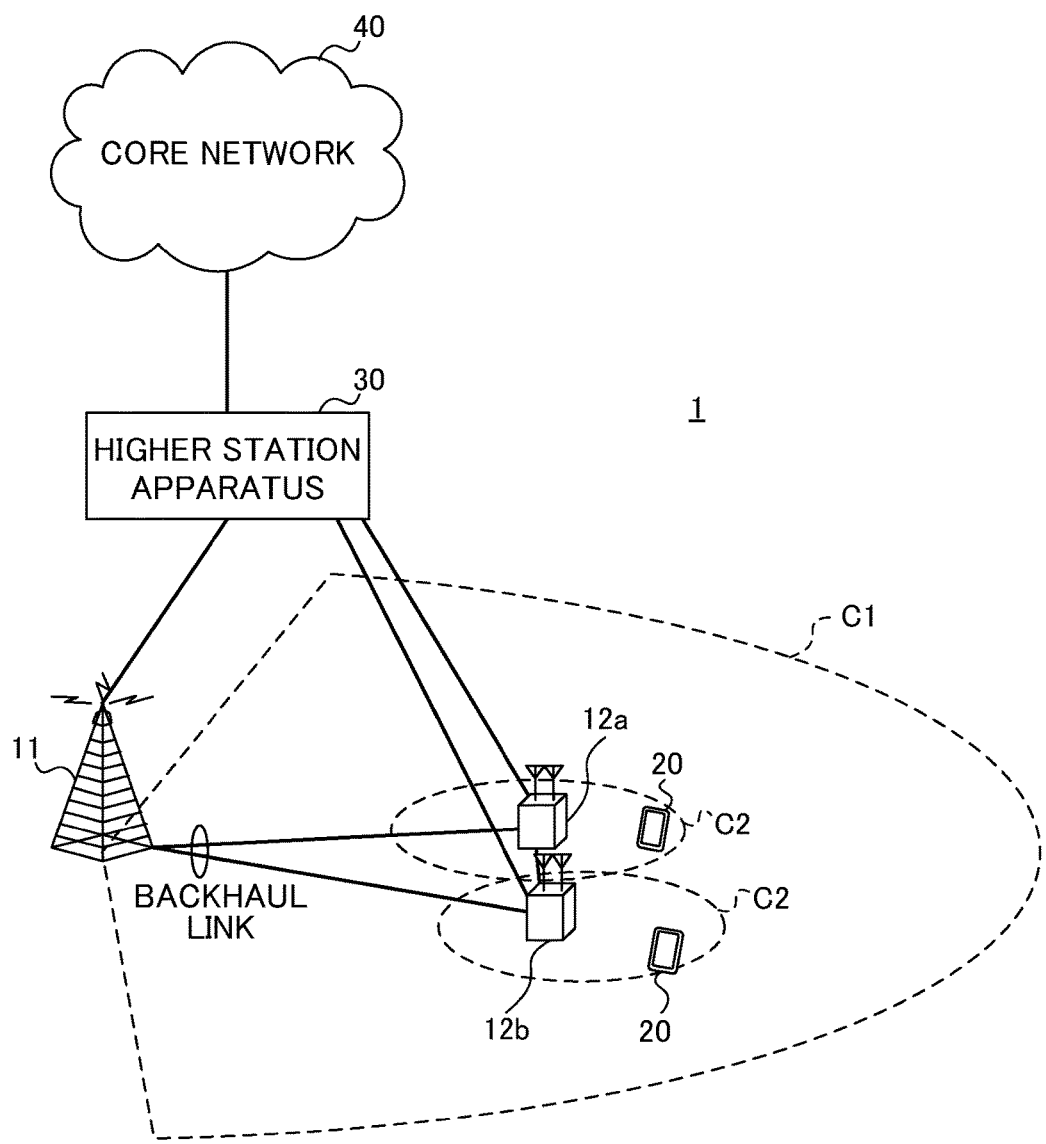
FIG. 13 is a schematic diagram to show an example of a radio communication system according to the present embodiment.

FIG. 13 is a schematic structure diagram of the radio communication system according to the present embodiment. Note that the radio communication system shown in FIG. 13 is a system to incorporate, for example, the LTE system or SUPER 3G. This radio communication system can adopt carrier aggregation (CA) to group a plurality of fundamental frequency blocks (component carriers) into one, where the system bandwidth of the LTE system constitutes one unit. Also, this radio communication system may be referred to as "IMT-advanced," or may be referred to as "4G," "FRA (Future Radio Access)," etc.

The radio communication system 1 shown in FIG. 13 includes a radio base station 11 that forms a macro cell C1, and radio base stations 12a and 12b that form small cells C2, which are placed inside the macro cell C1 and which are narrower than the macro cell C1. Also, user terminals 20 are placed in the macro cell C1 and in each small cell C2. The user terminals 20 can connect with both the radio base station 11 and the radio base stations 12 (dual connectivity). Also, intra-base station CA (intra-eNB CA) or inter-base station CA (inter-eNB CA) is applied between the radio base station 11 and the radio base station 12. Furthermore, it is possible that one of the radio base station 11 and the radio base station 12 employs FDD and the other one employs TDD.

Between the user terminals 20 and the radio base station 11, communication is carried out using a carrier of a relatively low frequency band (for example, 2 GHz) and a narrow bandwidth (referred to as, for example, "existing carrier," "legacy carrier" and so on). Meanwhile, between the user terminals 20 and the radio base stations 12, a carrier of a relatively high frequency band (for example, 3.5 GHz and so on) and a wide bandwidth may be used, or the same carrier as that used in the radio base station 11 may be used. A new carrier type (NCT) may be used as the carrier type between the user terminals 20 and the radio base stations 12. Between the radio base station 11 and the radio base stations 12 (or between the radio base stations 12), wire connection (optical fiber, X2 interface and so on) or wireless connection is established.

The radio base station 11 and the radio base stations 12 are each connected with a higher station apparatus 30, and are connected with a core network 40 via the higher station apparatus 30. Note that the higher station apparatus 30 may be, for example, an access gateway apparatus, a radio network controller (RNC), a mobility management entity (MME) and so on, but is by no means limited to these. Also, each radio base station 12 may be connected with the higher station apparatus via the radio base station 11.

Note that the radio base station 11 is a radio base station having a relatively wide coverage, and may be referred to as an "eNodeB," a "macro base station," a "transmitting/receiving point" and so on. Also, the radio base stations 12 are radio base stations having local coverages, and may be referred to as "small base stations," "pico base stations," "femto base stations," "Home eNodeBs," "micro base stations," "transmitting/receiving points" and so on. Hereinafter the radio base stations 11 and 12 will be collectively referred to as "radio base station 10," unless specified otherwise. The user terminals 20 are terminals to support various communication schemes such as LTE, LTE-A and so on, and may be both mobile communication terminals and stationary communication terminals.

In this radio communication system, as radio access schemes, OFDMA (Orthogonal Frequency Division Multiple Access) is applied to the downlink, and SC-FDMA (Single-Carrier Frequency Division Multiple Access) is applied to the uplink. OFDMA is a multi-carrier transmission scheme to perform communication by dividing a frequency band into a plurality of narrow frequency bands (subcarriers) and mapping data to each subcarrier. SC-FDMA is a single-carrier transmission scheme to mitigate interference between terminals by dividing the system band into bands formed with one or continuous resource blocks per terminal, and allowing a plurality of terminals to use mutually different bands.

Now, communication channels used in the radio communication system shown in FIG. 13 will be described. Downlink communication channels include a PDSCH (Physical Downlink Shared CHannel), which is used by each user terminal 20 on a shared basis, and downlink L1/L2 control channels (PDCCH, PCFICH, PHICH and enhanced PDCCH). User data and higher control information are transmitted by the PDSCH. Scheduling information for the PDSCH and the PUSCH and so on are transmitted by the PDCCH (Physical Downlink Control CHannel). The number of OFDM symbols to use for the PDCCH is transmitted by the PCFICH (Physical Control Format Indicator Channel). HARQ ACKs/NACKs for the PUSCH are transmitted by the PHICH (Physical Hybrid-ARQ Indicator CHannel). Also, the scheduling information for the PDSCH and the PUSCH and so on may be transmitted by the enhanced PDCCH (EPDCCH) as well. This EPDCCH is frequency-division-multiplexed with the PDSCH (downlink shared data channel).

Uplink control channels include a PUSCH (Physical Uplink Shared CHannel), which is used by each user terminal 20 on a shared basis as an uplink data channel, and a PUCCH (Physical Uplink Control CHannel), which is an uplink control channel. User data and higher control information are transmitted by this PUSCH. Also, by means of the PUCCH, downlink radio quality information (CQI: Channel Quality Indicator), ACKs/NACKs and so on are transmitted.

Figure 14:
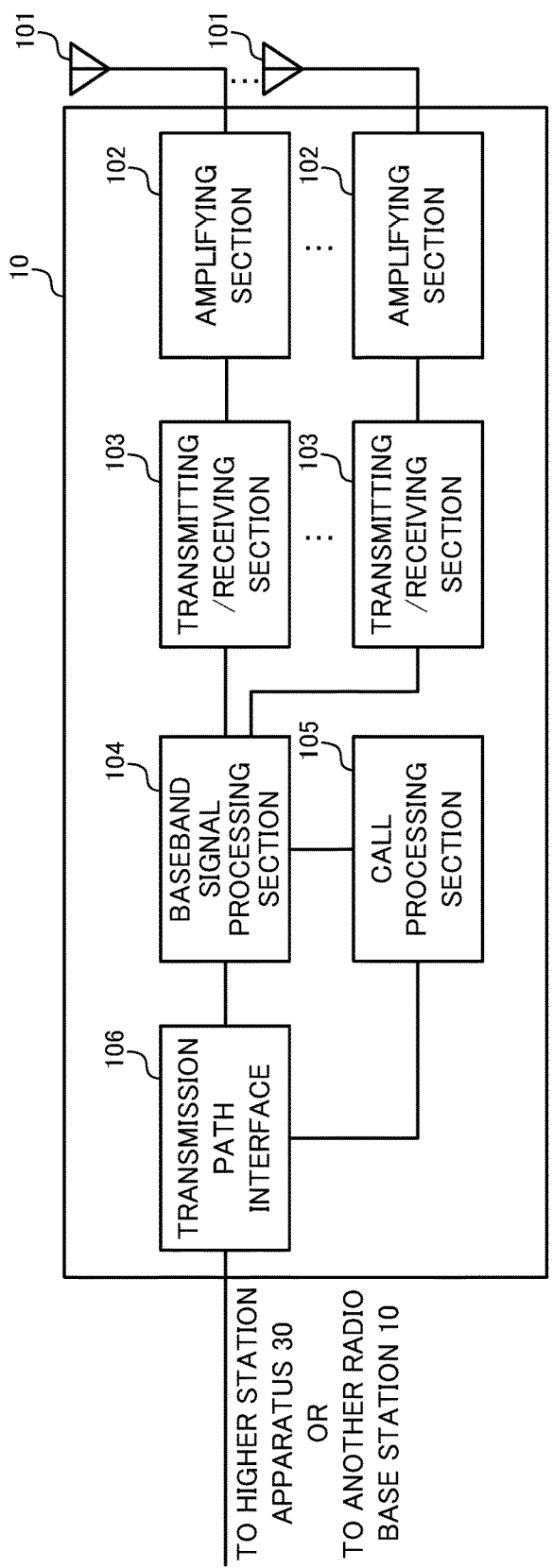
FIG. 14 is a diagram to explain an overall structure of a radio base station according to the present embodiment.

FIG. 14 is a diagram to show an overall structure of a radio base station 10 (which may be either a radio base station 11 or 12) according to the present embodiment. The radio base station 10 has a plurality of transmitting/receiving antennas 101 for MIMO transmission, amplifying sections 102, transmitting/receiving sections 103, a baseband signal processing section 104, a call processing section 105 and a transmission path interface 106.

User data to be transmitted from the radio base station 10 to the user terminals 20 on the downlink is input from the higher station apparatus 30, into the baseband signal processing section 104, via the transmission path interface 106.

In the baseband signal processing section 104, a PDCP layer process, division and coupling of user data, RLC (Radio Link Control) layer transmission processes such as an RLC retransmission control transmission process, MAC (Medium Access Control) retransmission control, including, for example, an HARQ transmission process, scheduling, transport format selection, channel coding, an inverse fast Fourier transform (IFFT) process and a precoding process are performed, and the result is transferred to each transmitting/receiving section 103. Furthermore, downlink control channel signals are also subjected to transmission processes such as channel coding and an inverse fast Fourier transform, and are transferred to each transmitting/receiving section 103.

Also, the baseband signal processing section 104 reports, to the user terminals 20, control information for allowing communication in the cell, through higher layer signaling (RRC signaling, broadcast signal and so on). The information for allowing communication in the cell includes, for example, the uplink or downlink system bandwidth, feedback resource information and so on. Each transmitting/receiving section 103 converts baseband signals that are pre-coded and output from the baseband signal processing section 104 on a per antenna basis, into a radio frequency band. The amplifying sections 102 amplify the radio frequency signals having been subjected to frequency conversion, and transmit the signals through the transmitting/receiving antennas 101.

On the other hand, as for data to be transmitted from the user terminals 20 to the radio base station 10 on the uplink, radio frequency signals that are received in the transmitting/receiving antennas 101 are each amplified in the amplifying sections 102, converted into baseband signals through frequency conversion in each transmitting/receiving section 103, and input in the baseband signal processing section 104.

In the baseband signal processing section 104, the user data that is included in the input baseband signals is subjected to an FFT process, an IDFT process, error correction decoding, a MAC retransmission control receiving process, and RLC layer and PDCP layer receiving processes, and the result is transferred to the higher station apparatus 30 via the transmission path interface 106. The call processing section 105 performs call processing such as setting up and releasing communication channels, manages the state of the radio base stations 10 and manages the radio resources.

Figure 15:
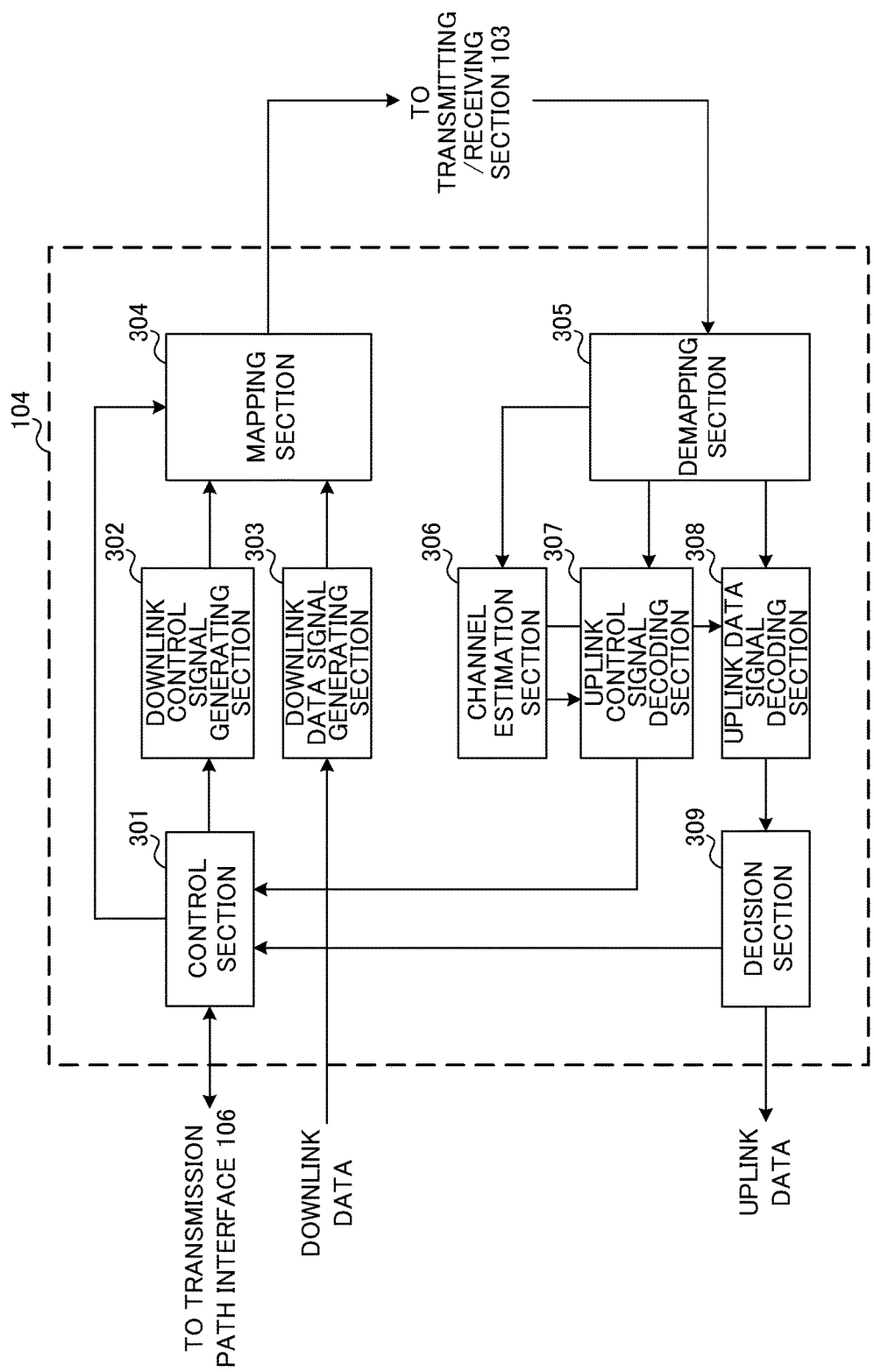
FIG. 15 is a diagram to explain a functional structure of a radio base station according to the present embodiment.

FIG. 15 is a diagram to show a principle functional structure of the baseband signal processing section 104 provided in the radio base station 10 according to the present embodiment. As shown in FIG. 15, the baseband signal processing section 104 provided in the radio base station 10 is comprised at least of a control section 301, a downlink control signal generating section 302, a downlink data signal generating section 303, a mapping section 304, a demapping section 305, a channel estimation section 306, an uplink control signal decoding section 307, an uplink data signal decoding section 308 and a decision section 309.

The control section 301 controls the scheduling of downlink user data that is transmitted in the PDSCH, downlink control information that is transmitted in the PDCCH and/or the enhanced PDCCH (EPDCCH), downlink reference signals and so on. Also, the control section 301 controls the scheduling of uplink data that is transmitted in the PUSCH, uplink control information that is transmitted in the PUCCH or the PUSCH, and uplink reference signals (allocation control). Information about the allocation control of uplink signals (uplink control signals and uplink user data) is reported to user terminals by using a downlink control signal (DCI).

To be more specific, the control section 301 controls the allocation of radio resources with respect to downlink signals and uplink signals, based on command information from the higher station apparatus 30, feedback information from each user terminal 20 and so on. That is, the control section 301 functions as a scheduler. Also, in inter-eNB CA, the control section 301 is provided for each of multiple CCs separately, and in intra-eNB CA, the control section 301 is provided to be shared by multiple CCs.

The downlink control signal generating section 302 generates downlink control signals (PDCCH signals and/or EPDCCH signals) determined to be allocated by the control section 301. To be more specific, based on commands from the control section 301, the downlink control signal generating section 302 generates a DL assignment to report downlink signal allocation information and a UL grant to report uplink signal allocation information.

For example, in accordance with the above first embodiment, the downlink control signal generating section 302 includes, in downlink control information (DCI), information that relates to the cell where A/N's are gathered and multiplexed (PUCCH transmission is carried out) in subframes in which the FDD cell and the TDD cell are both directed to UL. Also, in accordance with the above second embodiment, the downlink control signal generating section 302 includes, in downlink control information, information as to whether or not RF tuning is applied in subframes where the FDD cell and the TDD cell are both directed to UL.

To be more specific, the downlink control signal generating section 302 generates information that relates to the cell which the user terminal uses for A/N feedback (feedback target cell), the PUCCH resource to use in this cell, and so on, by using the SCell's ARI and the ARO. Alternatively, the downlink control signal generating section 302 generates information as to whether or not RF tuning is applied, the PUCCH resource to be used, and so on, by using the SCell's ARI and the ARO.

Note that the downlink control signal generating section 302 may generate control information by associating the information related to the user terminal's A/N feedback target cell, the information as to whether or not RF tuning is applied and so on with search space types, control channel types, or PDCCH/EPDCCH locations. In this case, the downlink control signal generating section 302 generates downlink control information based on commands from the control section 301.

The downlink data signal generating section 303 generates downlink data signals (PDSCH signals). The data signals that are generated in the data signal generating section 303 are subjected to a coding process and a modulation process, based on coding rates and modulation schemes that are determined based on CSI from each user terminal 20 and so on.

Based on commands from the control section 301, the mapping section 304 controls the allocation of the downlink control signals generated in the downlink control signal generating section 302 and the downlink data signals generated in the downlink data signal generating section 303, to radio resources.

The demapping section 305 demaps the uplink signals transmitted from the user terminals and separates the uplink signals. The channel estimation section 306 estimates the channel states from the reference signals included in the received signals separated in the demapping section 305, and outputs the estimated channel states to the uplink control signal decoding section 307 and the uplink data signal decoding section 308.

The uplink control signal decoding section 307 decodes the feedback signals (delivery acknowledgement signals, etc.) transmitted from the user terminals through an uplink control channel (PUCCH), and outputs the results to the control section 301. The uplink data signal decoding section 308 decodes the uplink data signals transmitted from the user terminals through an uplink shared channel (PUSCH), and outputs the results to the decision section 309. The decision section 309 makes retransmission control decisions (A/N decisions) based on the decoding results in the uplink data signal decoding section 308, and outputs the results to the control section 301.

Figure 16:
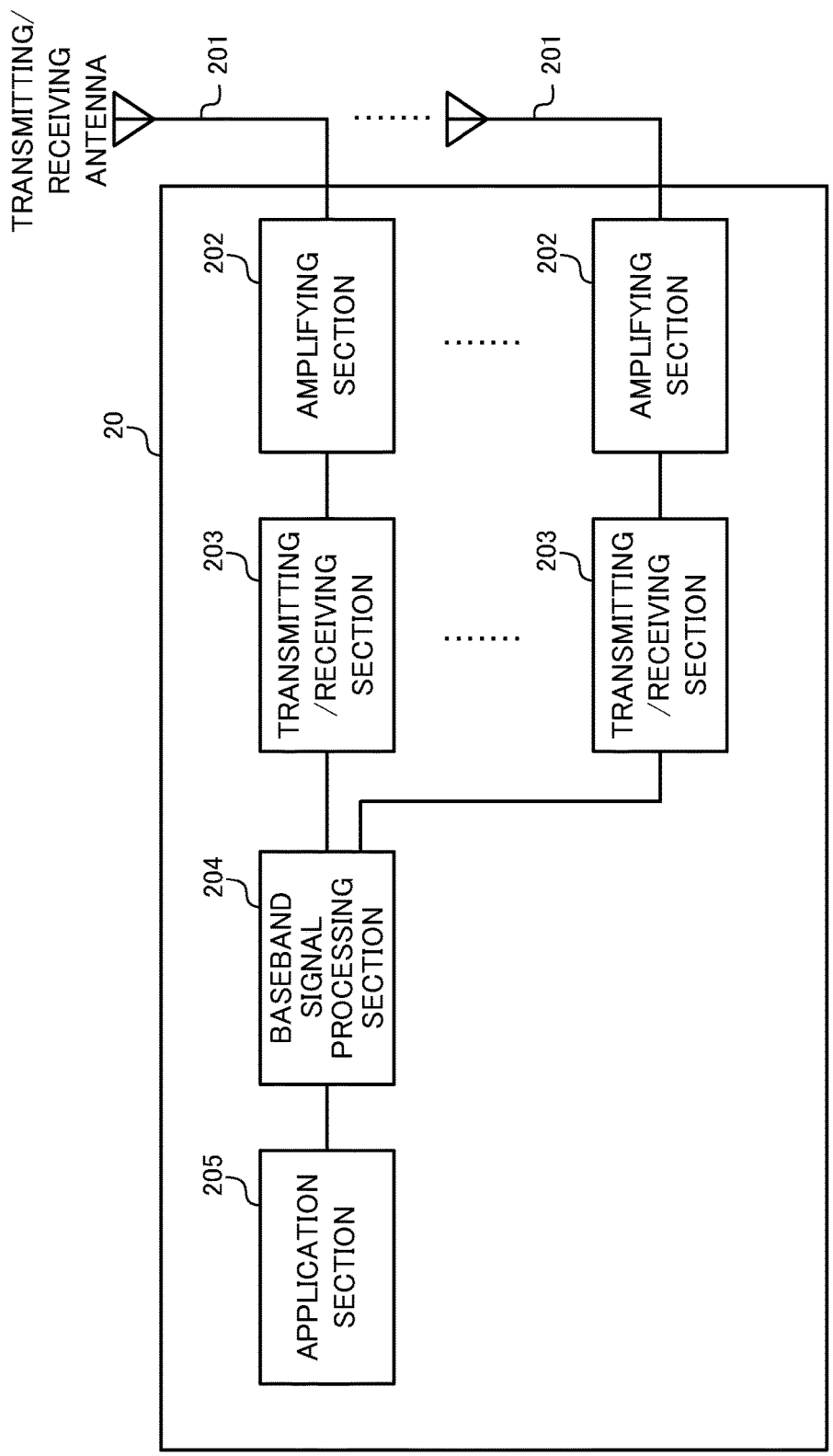
FIG. 16 is a diagram to explain an overall structure of a user terminal according to the present embodiment.

FIG. 16 is a diagram to show an overall structure of a user terminal 20 according to the present embodiment. A user terminal 20 has a plurality of transmitting/receiving antennas 201 for MIMO transmission, amplifying sections 202, transmitting/receiving sections (receiving sections) 203, a baseband signal processing section 204 and an application section 205.

As for downlink data, radio frequency signals that are received in the plurality of transmitting/receiving antennas 201 are each amplified in the amplifying sections 202, and subjected to frequency conversion and converted into the baseband signal in the transmitting/receiving sections 203. This baseband signal is subjected to receiving processes such as an FFT process, error correction decoding and retransmission control, in the baseband signal processing section 204. In this downlink data, downlink user data is transferred to the application section 205. The application section 205 performs processes related to higher layers above the physical layer and the MAC layer. Also, in the downlink data, broadcast information is also transferred to the application section 205.

Meanwhile, uplink user data is input from the application section 205 to the baseband signal processing section 204. In the baseband signal processing section 204, a retransmission control (H-ARQ (Hybrid ARQ)) transmission process, channel coding, precoding, a DFT process, an IFFT process and so on are performed, and the result is transferred to each transmitting/receiving section 203. The baseband signal that is output from the baseband signal processing section 204 is converted into a radio frequency band in the transmitting/receiving sections 203. After that, the amplifying sections 202 amplify the radio frequency signals having been subjected to frequency conversion, and transmit the resulting signals from the transmitting/receiving antennas 201.

Figure 17:
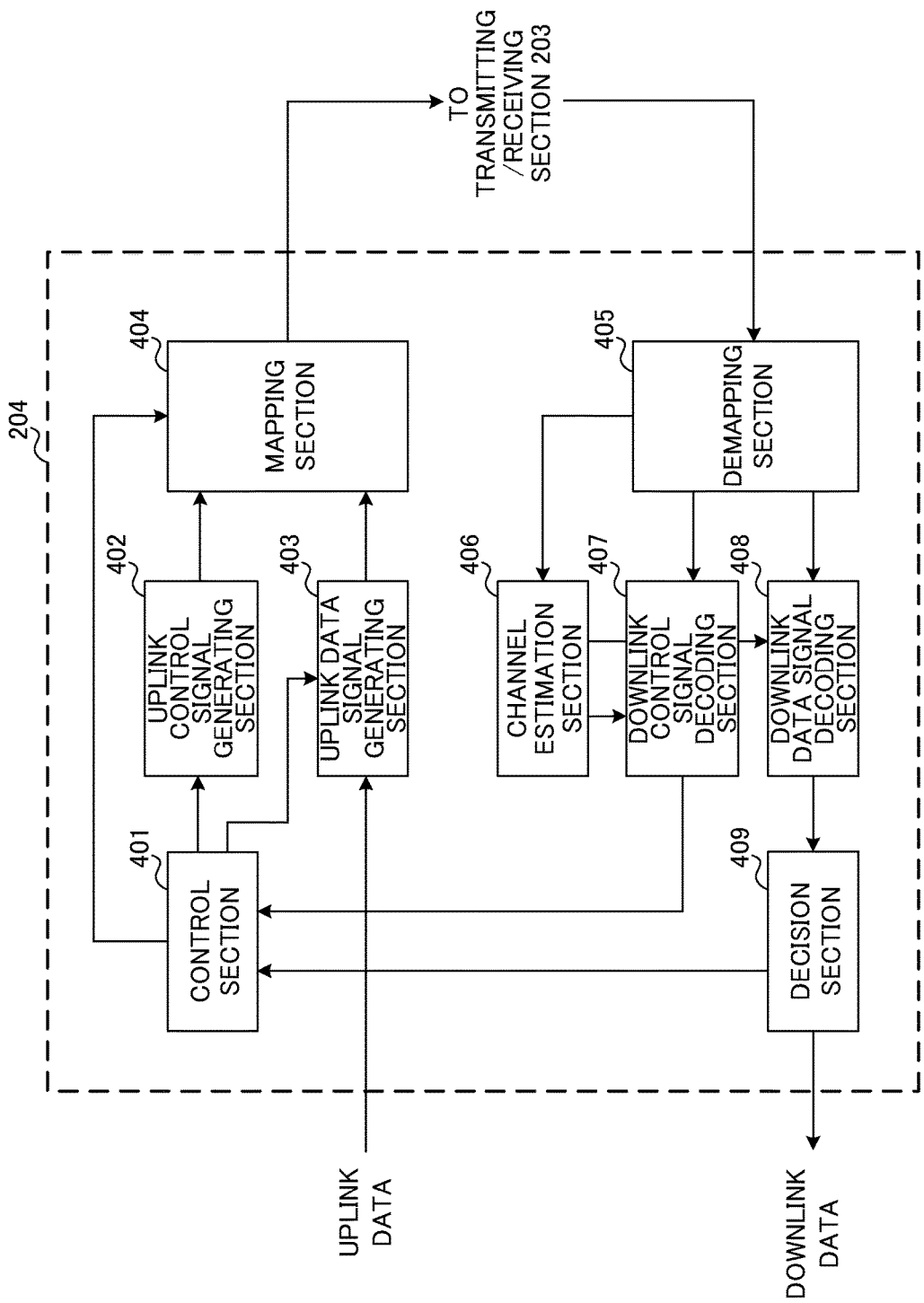
FIG. 17 is a diagram to explain a functional structure of a user terminal according to the present embodiment.

FIG. 17 is a diagram to show a principle functional structure of the baseband signal processing section 204 provided in the user terminal 20. As shown in FIG. 17, the baseband signal processing section 204 provided in the user terminal 20 is comprised at least of a control section 401 (feedback control section), an uplink control signal generating section 402, an uplink data signal generating section 403, a mapping section 404, a demapping section 405, a channel estimation section 406, a downlink control signal decoding section 407, a downlink data signal decoding section 408 and a decision section 409.

The control section 401 controls the generation of uplink control signals (A/N signals and so on) and uplink data signals based on the downlink control signals (PDCCH signals) transmitted from the radio base stations, retransmission control decisions with respect to the PDSCH signals received, and so on. The downlink control signals received from the radio base stations are output from the downlink control signal decoding section 408, and the retransmission control decisions are output from the decision section 409.

Also, the control section 401 also functions as a feedback control section that controls the feedback of delivery acknowledgement signals (A/N's) in response to the PDSCH signals. To be more specific, in a communication system in which CA is employed, the control section 401 determines the cell (or CC) to feed back A/N's, the PUCCH resources to allocate the A/N's to, and so on. For example, based on downlink control signals transmitted from the radio base stations and so on, the control section 401 determines the A/N feedback target cell, the PUCCH resources to use and so on, and indicate these to the mapping section 404.

For example, in accordance with above example 1 of the first embodiment, which employs TDD-FDD CA, the control section 401 executes control so that, when A/N's are transmitted in one CC, PUCCH transmission is carried out only in the FDD cell (see above FIG. 7). In this case, regardless of whether the FDD cell serves as the PCell or as the SCell, the A/N's are fed back using the FDD cell's PUCCH.

In accordance with above example 2 of the first embodiment, the control section 401 executes control so that, when A/N's are transmitted in one CC, PUCCH transmission is carried out using the FDD cell and the TDD cell (see above FIG. 8). To be more specific, the control section 401 executes control so that PUCCH transmission is carried out in the TDD cell's UL in timings where the FDD cell and the TDD cell are both directed to UL, and PUCCH transmission is carried out in the FDD cell's UL in the other subframes.

In accordance with above example 3 of the first embodiment, when ACKs/NACKs are transmitted in one CC, the control section 401 determines the cell to carry out PUCCH transmission in subframe where the FDD cell and the TDD cell are both directed to UL, based on whether or not there are A/N's to transmit in the FDD cell or the TDD cell (see above FIG. 9).

Figure 11:
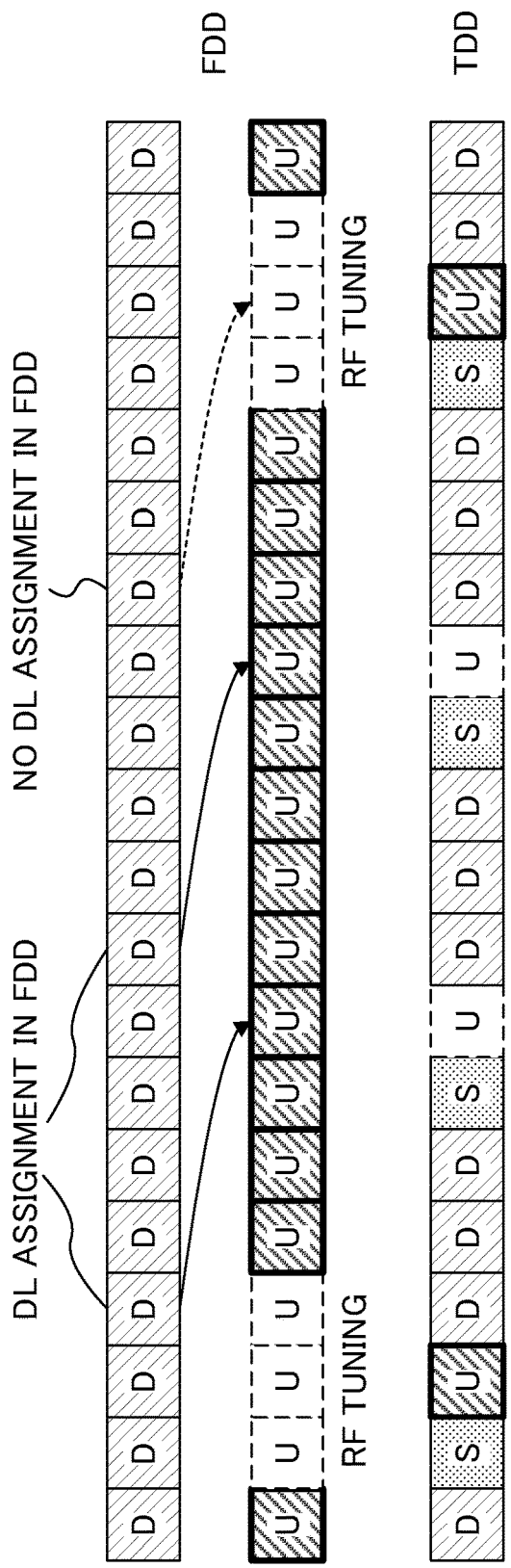
FIG. 11 is a diagram to explain an example of the feedback method according to the present embodiment, which provides RF tuning periods in TDD-FDD CA.

Also, in accordance with the above second embodiment, which employs TDD-FDD CA, the control section 401 determines whether or not to apply RF tuning in timings where the FDD cell and the TDD cell are both directed to UL, based on whether or not there are A/N's to transmit in the FDD cell or in the TDD cell (see above FIG. 11).

The uplink control signal generating section 402 generates uplink control signals (feedback signals such as delivery acknowledgement signals, channel state information (CSI) and so on) based on commands from the control section 401. Also, the uplink data signal generating section 403 generates uplink data signals based on commands from the control section 401. Note that, when a UL grant is included in a downlink control signal reported from the radio base stations, the control section 401 commands the uplink data signal generating section 403 to generate an uplink data signal.

The mapping section 404 (allocation section) controls the allocation of uplink control signals (delivery acknowledgement signals, etc.) and uplink data signal to radio resources (PUCCH and PUSCH) based on commands from the control section 401. For example, depending on the CC (cell) to send feedback (PUCCH transmission), the mapping section 404 allocates the A/N's to the PUCCH of that CC (cell).

The demapping section 405 demaps a downlink signal transmitted from the radio base station 10 and separates the downlink signal. The channel estimation section 406 estimates the channel state from the reference signals included in the received signal separated in the demapping section 405, and outputs the estimated channel state to the downlink control signal decoding section 407 and the downlink data signal decoding section 408.

The downlink control signal decoding section 407 decodes the downlink control signal (PDCCH signal) transmitted in the downlink control channel (PDCCH), and outputs the scheduling information (information regarding the allocation to uplink resources) to the control section 401. Also, when information related to the cell to feed back delivery acknowledgement signals or information as to whether or not to apply RF tuning is included in a downlink control signal, these pieces of information are also output to the control section 401.

The downlink data signal decoding section 408 decodes the downlink data signal transmitted in the downlink shared channel (PDSCH), and outputs the result to the decision section 409. The decision section 409 makes a retransmission control decision (A/N decision) based on the decoding result in the downlink data signal decoding section 408, and also outputs the result to the control section 401.

Now, although the present invention has been described in detail with reference to the above embodiments, it should be obvious to a person skilled in the art that the present invention is by no means limited to the embodiments described herein. The present invention can be implemented with various corrections and in various modifications, without departing from the spirit and scope of the present invention defined by the recitations of the claims. For example, a plurality of embodiments and/or examples described above may be combined and implemented as appropriate. Consequently, the description herein is provided only for the purpose of explaining examples, and should by no means be construed to limit the present invention in any way.

The disclosure of Japanese Patent Application No. 2013-199481, filed on Sep. 26, 2013, including the specification, drawings and abstract, is incorporated herein by reference in its entirety.

The invention claimed is:

1. A user terminal that communicates with a Frequency Division Duplex (FDD) cell and a Time Division Duplex (TDD) cell by employing carrier aggregation, the user terminal comprising:
    a receiver that receives DL signals transmitted from each of the FDD cell and the TDD cell; and
    a processor that allocates delivery acknowledgement signals in response to the DL signals received, by allocating the delivery acknowledgment signals in a predetermined UL subframe,
    wherein, regardless of whether the FDD cell or the TDD cell is configured as a primary cell, when UL subframes are configured in both of the FDD cell and the TDD cell, the processor feeds back the delivery acknowledgement signals in response to the DL signal from the FDD cell and the DL signal from the TDD cell independently by using respective UL control channels of the FDD cell and TDD cell, and, when a UL subframe is configured only in the FDD cell, the processor feeds back the delivery acknowledgement signals using the UL control channel of the FDD cell, and feedback is not carried out in the TDD cell.

2. The user terminal according to claim 1, wherein the processor applies a same Hybrid Automatic Repeat Request (HARD) timing when the FDD cell and the TDD cell are scheduled by different schedulers and the same HARQ timing when the FDD cell and the TDD cell are scheduled by a same scheduler.

3. The user terminal according to claim 1, wherein, when the UL subframes are configured in both of the FDD cell and the TDD cell, the receiver receives downlink control information (DCI) that includes information of the UL control channels of the respective cells.

4. A base station that communicates with a user terminal by employing carrier aggregation with a Frequency Divison Duplex (FDD) cell and a Time Division Duplex (TDD) cell, the base station comprising:
    a transmitter that transmits a DL signal from each of the FDD cell and the TDD cell; and
    a receiver that receives, in a predetermined UL subframe, a delivery acknowledgement signal that is transmitted from the user terminal in response to the DL signal transmitted from the user terminal,
    wherein, regardless of whether the FDD cell or the TDD cell is configured as a primary cell, when UL subframes are configured in both of the FDD cell and the TDD cell, the receiver receives the delivery acknowledgement signals fed back in response to the DL signal from the FDD cell and the DL signal from the TDD cell independently by using respective UL control channels of the FDD cell and TDD cell, and, when a UL subframe is configured only in the FDD cell, the receiver receives the delivery acknowledgement signals fed back using the UL control channel of the FDD cell and feedback is not carried out in the TDD cell.

5. A radio communication method for a user terminal that communicates with a Frequency Division Duplex (FDD) cell and a Time Division Duplex (TDD) cell by employing carrier aggregation, the radio communication method comprising the steps of:

receiving DL signals transmitted from each of the FDD cell and the TDD cell; and allocating delivery acknowledgement signals in response to the DL signals received, by allocating the delivery acknowledgment signals in a predetermined UL subframe, wherein, regardless of whether the FDD cell or the TDD cell is configured as a primary cell, when UL subframes are configured in both of the FDD cell and the TDD cell, the delivery acknowledgement signals are fed back in response to the DL signal from the FDD cell and the DL signal from the TDD cell independently by using respective UL control channels of the FDD cell and TDD cell, and, when a UL subframe is configured only in the FDD cell, the delivery acknowledgement signals are fed back using the UL control channel of the FDD cell, and feedback is not carried out in the TDD cell.

* * * * *